US011696661B2

(12) United States Patent
Itano et al.

(10) Patent No.: US 11,696,661 B2
(45) Date of Patent: Jul. 11, 2023

(54) COOKING SYSTEM AND PROCESS FOR COOKING WITH AN AUXILIARY TOOL

(71) Applicant: Connected Robotics Inc., Tokyo (JP)

(72) Inventors: Koji Itano, Tokyo (JP); Shota Ohkubo, Tokyo (JP); Ranjan Rasakatla Sri, Tokyo (JP); Toshiaki Igarashi, Tokyo (JP)

(73) Assignee: CONNECTED ROBOTICS INC., Tokyo (JP)

( * ) Notice: Subject to any disclaimer, the term of this patent is extended or adjusted under 35 U.S.C. 154(b) by 0 days.

(21) Appl. No.: 17/889,409

(22) Filed: Aug. 17, 2022

(65) Prior Publication Data

US 2022/0386822 A1 Dec. 8, 2022

Related U.S. Application Data

(63) Continuation of application No. PCT/JP2021/005578, filed on Feb. 15, 2021.

(30) Foreign Application Priority Data

Feb. 17, 2020 (JP) .................................. 2020-024788
Feb. 17, 2020 (JP) .................................. 2020-024789

(51) Int. Cl.
*A47J 44/00* (2006.01)
*A47J 27/14* (2006.01)
(Continued)

(52) U.S. Cl.
CPC .............. *A47J 44/00* (2013.01); *A47J 27/14* (2013.01); *B25J 11/0045* (2013.01); *B25J 9/0087* (2013.01)

(58) Field of Classification Search
CPC ...... A47J 44/00; B25J 11/0045; B25J 9/0087; G05B 19/042; G05B 19/4155
See application file for complete search history.

(56) References Cited

U.S. PATENT DOCUMENTS 5,132,914 A * 7/1992 Cahlander .............. A47J 27/14
700/211
7,174,830 B1 * 2/2007 Dong ..................... B25J 9/0087
99/348
(Continued)

FOREIGN PATENT DOCUMENTS

CN 102248530 A 11/2011
GB 2547286 A * 8/2017 .............. A47J 44/00
(Continued)

OTHER PUBLICATIONS

Notice of Reasons for Refusal dated Sep. 7, 2021, received for JP Application 2021-541681, 10 pages including English Translation.
(Continued)

*Primary Examiner* — Reginald Alexander
(74) *Attorney, Agent, or Firm* — Xsensus LLP

(57) ABSTRACT

A cooking system comprises a robot; and a memory storing computer executable instructions which, when executed, cause the robot to execute a plurality of operations comprising: a first operation including picking up a cooking auxiliary tool in which a cooking target is set in a first section, conveying the cooking auxiliary tool to a second section, and causing the cooking target in the cooking auxiliary tool to undergo first cooking processing in the second section; and a second operation including conveying the cooking auxiliary tool storing the cooking target having undergone the first cooking processing in the second section to a third section. A duct is arranged in an upper space of the second section, the robot has a proximal end that is fixed to a vertical wall member, and the proximal end of the robot is attached to the wall member at a location away from the second section.

17 Claims, 25 Drawing Sheets

(51) Int. Cl.
　　　*B25J 11/00*　　　　(2006.01)
　　　*B25J 9/00*　　　　(2006.01)

(56) References Cited

U.S. PATENT DOCUMENTS

| | | | | |
|---|---|---|---|---|
| 9,815,191 | B2* | 11/2017 | Oleynik | ................. G05B 19/42 |
| 11,351,673 | B2* | 6/2022 | Zito | ..................... G06Q 10/087 |
| 2005/0193901 | A1 | 9/2005 | Buehler | |
| 2019/0352028 | A1* | 11/2019 | Mirkhaef | ............. B25J 11/0045 |
| 2020/0030966 | A1 | 1/2020 | Hasegawa et al. | |
| 2020/0139554 | A1* | 5/2020 | Sinnet | ..................... B25J 9/162 |
| 2021/0022559 | A1* | 1/2021 | Zito | ........................ A47J 44/00 |
| 2021/0196081 | A1* | 7/2021 | Kodali | ................... B25J 11/008 |
| 2021/0321813 | A1* | 10/2021 | Shiraki | ................ A47J 27/086 |

FOREIGN PATENT DOCUMENTS

| | | |
|---|---|---|
| JP | 3878160 B2 | 2/2007 |
| JP | 2011-088273 A | 5/2011 |
| JP | 2016-022557 A | 2/2016 |
| JP | 2017-136281 A | 8/2017 |
| WO | 2018155516 A1 | 12/2019 |

OTHER PUBLICATIONS

Decision to Grant dated Oct. 12, 2021, received for JP Application 2021-541681, 5 pages including English Translation.
International Preliminary Report On Patentability (Chapter I) dated Sep. 1, 2022, corresponding PCT/JP2021/005578, 6 pages.

\* cited by examiner

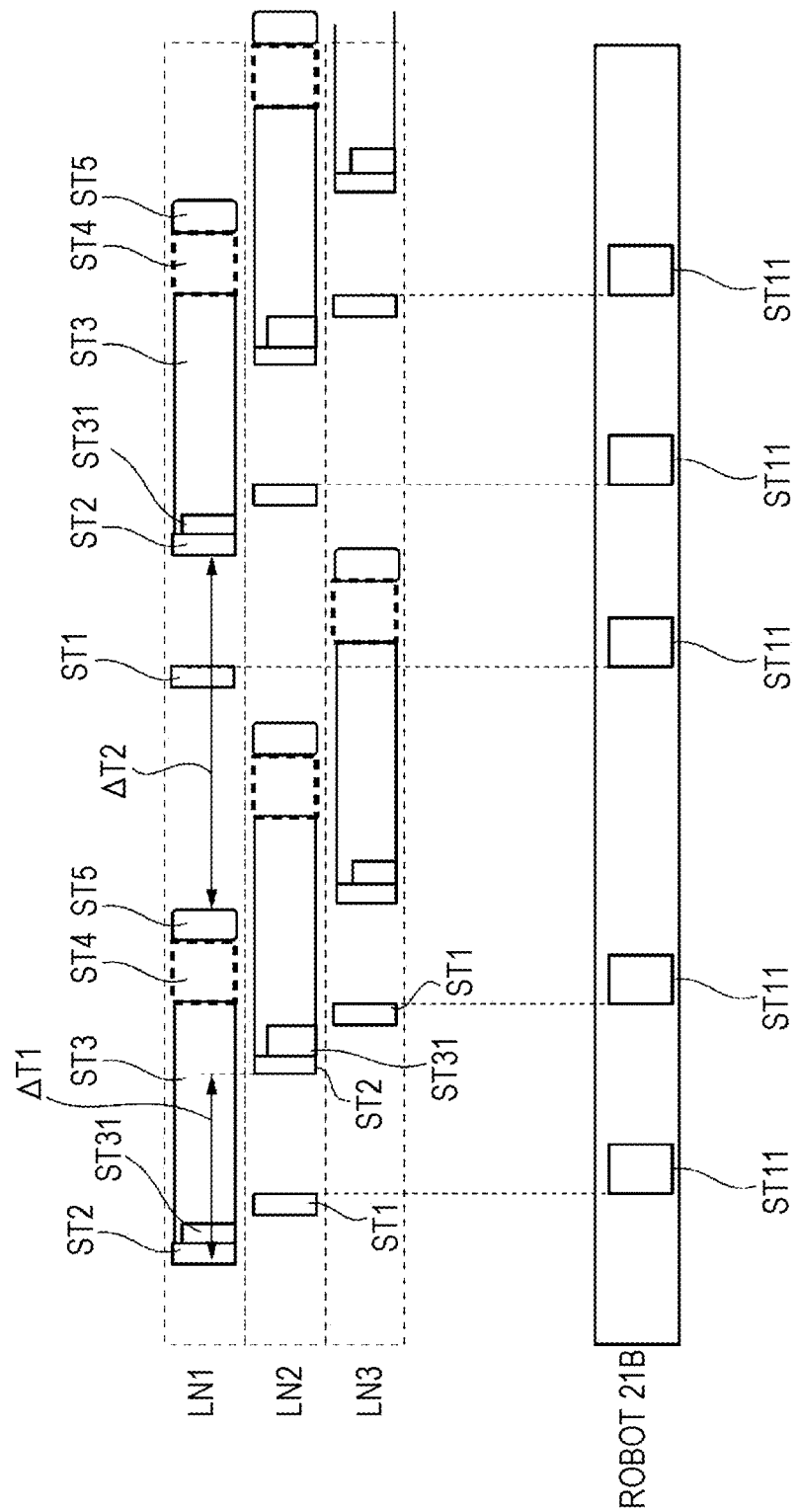

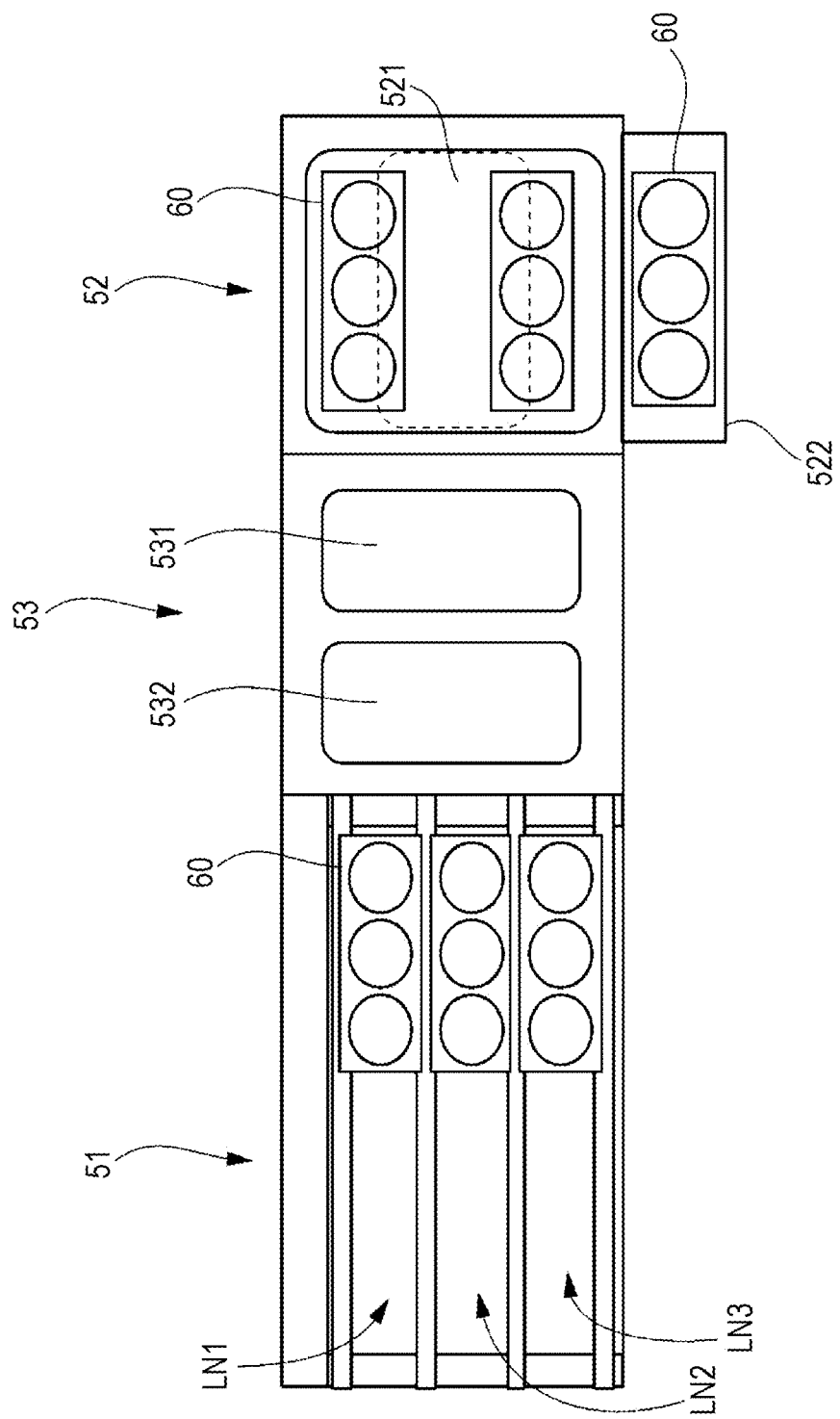

COOKING SYSTEM AND PROCESS FOR COOKING WITH AN AUXILIARY TOOL

CROSS-REFERENCE TO RELATED APPLICATIONS

This application is a bypass continuation of and claims priority to PCT/JP2021/005578, filed Feb. 15, 2021, which claims priority to JP 2020-024788, filed Feb. 17, 2020, and JP 2020-024789, filed Feb. 17, 2020, the contents of each of which is hereby incorporated by reference in their entirety.

BACKGROUND

Conventionally, a cooking system includes a bucket for conveying noodles.

SUMMARY

In accordance with an aspect of the present disclosure, a cooking system comprises a robot; and a memory storing computer executable instructions which, when executed, cause the robot to execute a plurality of operations comprising: a first operation including picking up a cooking auxiliary tool in which a cooking target is set in a first section, conveying the cooking auxiliary tool to a second section, and causing the cooking target in the cooking auxiliary tool to undergo first cooking processing in the second section; and a second operation including conveying the cooking auxiliary tool storing the cooking target having undergone the first cooking processing in the second section to a third section, wherein a duct is arranged in an upper space of the second section, the robot has a proximal end that is fixed to a vertical wall member, and the proximal end of the robot is attached to the wall member at a location away from the second section.

BRIEF DESCRIPTION OF DRAWINGS

FIG. 23 is a time-line chart illustrating timings of works in a series of processes.

FIG. 24 is a diagram exemplifying how to use a cooking area.

DETAILED DESCRIPTION

Figure 1:
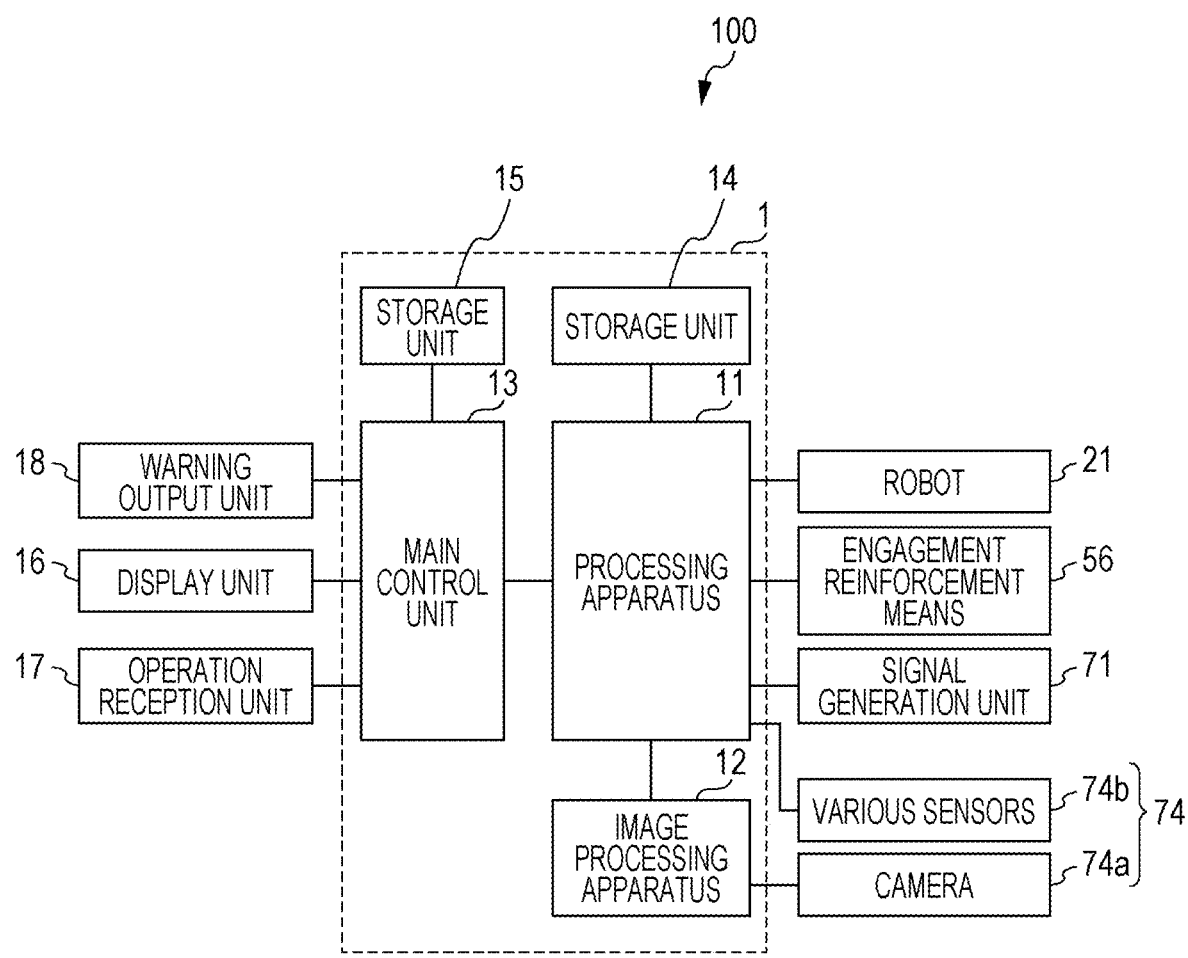
FIG. 1 is a diagram illustrating a configuration of a cooking system according to a first embodiment.

The inventors have recognized that it can be difficult when using a conventional cooking system to efficiently cook a cooking target. To address this problem, the inventors have developed the technology discussed in this disclosure so as to efficiently cook the cooking target.

According to an aspect of the present disclosure, provided is a control program for causing a computer to execute robot control processing for causing a robot to execute a plurality of operations in a cooking area including a plurality of sections, the plurality of operations including a first operation of picking up a cooking auxiliary tool in which a cooking target is set, in a first section, conveying the cooking auxiliary tool to a second section, and causing the cooking target in the cooking auxiliary tool to undergo first cooking processing in the second section, and a second operation of picking up the cooking auxiliary tool storing the cooking target having undergone the first cooking processing in the second section, and conveying the cooking auxiliary tool to a third section.

In the above-described aspect, the second operation further includes causing the cooking target in the cooking auxiliary tool to undergo second cooking processing in the third section, and the plurality of operations further includes a third operation of picking up the cooking auxiliary tool storing the cooking target having undergone the second cooking processing in the third section, and conveying the cooking auxiliary tool to the first section.

In the above-described aspect, the second cooking processing includes a plurality of types of cooking processing allocated to a plurality of respective sub-sections forming the third section, and the second operation further includes conveying the cooking auxiliary tool storing the cooking target, between the plurality of sub-sections.

In the above-described aspect, the robot is controllable in a mode selected from among a plurality of modes including a first mode of sequentially performing a series of operations from the first operation to the third operation, and a second mode of repeating only the first operation and the second operation.

In the above-described aspect, the mode is selected based on information indicating a state or an attribute of a worker.

In the above-described aspect, the computer is further caused to execute processing of generating abnormality information based on sensor information from a plurality of sensors provided in the cooking area, and sensor information from a plurality of sensors provided in the robot.

The present disclosure provides a cooking system including a robot, and a control program for causing the robot to execute a plurality of operations, in which the plurality of operations includes a first operation of picking up a cooking auxiliary tool in which a cooking target is set, in a first section, conveying the cooking auxiliary tool to a second section, and causing the cooking target in the cooking auxiliary tool to undergo first cooking processing in the second section, and a second operation of picking up the cooking auxiliary tool storing the cooking target having undergone the first cooking processing in the second section, and conveying the cooking auxiliary tool to a third section, and the robot is a multijoint robot and is supported on a vertical wall member.

In the above-described aspect, the robot is supported on a vertical wall member in the third section.

The present disclosure provides a control program for causing a computer to execute robot control processing for causing a first robot and a second robot to execute a plurality of operations in a cooking area including a plurality of sections, the plurality of operations including a fourth operation of setting a cooking auxiliary tool at a predetermined position that is to be executed by the first robot, a fifth operation of picking up the cooking target and setting the cooking target into the cooking auxiliary tool set at the predetermined position by the first robot that is to be executed by the second robot, a first operation of picking up, at the predetermined position, the cooking auxiliary tool in which the cooking target is set by the fifth operation, and causing the cooking target in the cooking auxiliary tool to undergo first cooking processing in the second section, and a second operation of picking up the cooking auxiliary tool storing the cooking target having undergone the first cooking processing in the second section, and conveying the cooking auxiliary tool to a third section.

In the above-described aspect, the predetermined position is positioned in the second section.

In the above-described aspect, the first robot is arranged on one side of the predetermined position in an arrangement direction of the plurality of sections, and the second robot is arranged on another side of the predetermined position in the arrangement direction.

In the above-described aspect, the third section includes a plurality of sub-sections allocated to different pieces of cooking processing, and the plurality of sub-sections is arranged in order from the predetermined position toward the one side in accordance with an order of cooking processing.

In the above-described aspect, the plurality of operations further includes an operation of conveying a container in which a plurality of uncooked cooking targets is arranged that is to be executed by the second robot in a fourth section.

In the above-described aspect, the fourth section exists on an opposite side of the third section across the predetermined position in an arrangement direction of the plurality of sections.

In the above-described aspect, the plurality of operations includes a release operation of releasing the container holding the cooking target having undergone cooking processing in the third section, in the fourth section existing on an opposite side of the third section across the predetermined position in the arrangement direction that is to be executed by the second robot, and an operation of picking up the container being empty and arranged in the fourth section that is to be executed by the second robot after the release operation.

In the above-described aspect, the robot control processing causes the robot to repeatedly execute the first operation and the second operation, and an operation timing of the first operation is defined in accordance with an operation timing of the first operation executed previous time.

In the above-described aspect, the robot processing apparatus causes the robot to repeatedly execute the first operation and the second operation in series on a plurality of the cooking targets, the first operation corresponds to a work of causing the first cooking processing to be performed, the second operation corresponds to a work of ending the first cooking processing, a cooking time of the first cooking processing is predetermined, and a start time of the first operation is controlled in such a manner that the second operation on one cooking target of the plurality of cooking targets that is to be executed by the robot does not simultaneously conflict with the first operation or the second operation on another cooking target of the plurality of cooking targets.

In the above-described aspect, the first cooking processing is processing of boiling the cooking target.

The present disclosure provides a cooking system including a first robot, a second robot, and a control program for causing the first robot and the second robot to execute a plurality of operations, in which the plurality of operations includes a fourth operation of setting a cooking auxiliary tool at a predetermined position that is to be executed by the first robot, a fifth operation of picking up a cooking target and setting the cooking target into the cooking auxiliary tool set at the predetermined position by the first robot that is to be executed by the second robot, a first operation of picking up, at the predetermined position, the cooking auxiliary tool in which the cooking target is set by the fifth operation, and causing the cooking target in the cooking auxiliary tool to undergo first cooking processing in the second section, and a second operation of picking up the cooking auxiliary tool storing the cooking target having undergone the first cooking processing in the second section, and conveying the cooking auxiliary tool to a third section, and the first robot and the second robot are multijoint robots and supported on a vertical wall member.

Hereinafter, embodiments will be described in detail with reference to the attached drawings.

First Embodiment

FIG. 1 is a diagram illustrating a configuration of a cooking system 100. The cooking system 100 includes a control device 1. In addition, the control device 1 may be implemented by one or more computers. In this case, the one or more computers may include a server computer.

As illustrated in FIG. 1, the control device 1 of the present embodiment includes a processing apparatus 11 that controls an operation of a robot 21 serving as a work device, an image processing apparatus 12 that processes an image obtained by a camera 74a that captures an image of a cooking area 50, a main control unit 13, a storage unit 14 storing programs defining processing in the processing apparatus 11, and data necessary for control of the processing apparatus 11, and a storage unit 15 storing programs defining processing in the main control unit 13, and data necessary for control of the main control unit 13. Functions of the control device 1 that are to be described below can be implemented by the processing apparatus 11 and/or the main control unit 13 executing one or more programs stored in the storage unit 14 and/or the storage unit 15. The storage unit 14 and the storage unit 15 may each comprise a memory. In addition, the storage unit 14 and the storage unit 15 may be implemented by a common storage device or each may be a separate storage device. Furthermore, the image processing apparatus 12 is a single graphics processing unit (GPU), for example, but may be implemented by a processing apparatus (processing apparatus including a GPU) different from the processing apparatus 11.

The control device 1, processing apparatus 11 and/or main control unit 13 may also be encompassed by or is a component of control circuitry and/or processing circuitry. The functionality of the elements disclosed herein may be implemented using circuitry or processing circuitry which includes general purpose processors, special purpose processors, integrated circuits, ASICs ("Application Specific Integrated Circuits"), conventional circuitry and/or combinations thereof which are configured or programmed to perform the disclosed functionality. Processors are considered processing circuitry or circuitry as they include transistors and other circuitry therein. The processor may be a programmed processor which executes a program stored in a memory. In the disclosure, the circuitry, units, or means are hardware that carry out or are programmed to perform the recited functionality. The hardware may be any hardware disclosed herein or otherwise known which is programmed or configured to carry out the recited functionality. When the hardware is a processor which may be considered a type of circuitry, the circuitry, means, or units are a combination of hardware and software, the software being used to configure the hardware and/or processor. Furthermore, a display unit 16 that displays an operating state or the like of the control device 1, an operation reception unit 17 that receives an operation of a worker or the like, and a warning output unit 18 are connected to the main control unit 13. The main control unit 13 may output an advice or a warning to a user (worker) via the display unit 16 or the warning output unit 18. For example, the main control unit 13 executes processing of generating abnormality information in a case where a predetermined abnormality is detected based on sensor information from a plurality of sensors 74, the camera 74a, or various sensors 74b, and sensor information from a plurality of sensors provided in the robot 21, which will be described later. In addition, the predetermined abnormality to be detected may be any abnormality, and the abnormality information may be a message designating or indicating an abnormality type, or may be mere warning sound or the like.

Furthermore, the processing apparatus 11 controls engagement reinforcement means 56. The engagement reinforcement means 56 is an electromagnet, for example, but may be a negative pressure generation device or the like that generates suction power (negative pressure), or may be a combination of these.

Furthermore, the processing apparatus 11 controls the engagement reinforcement means 56 based on information from a signal generation unit 71. The signal generation unit 71 may be a proximity sensor, a pressure sensor, an image sensor, or the like, for example.

Furthermore, the processing apparatus 11 is connected to the plurality of sensors 74 arranged in the cooking area 50. The plurality of sensors 74 includes the camera 74a (image sensor) and the other various sensors 74b, and includes a function of detecting a state of the cooking area 50. In addition, two or more cameras 74a may be provided.

The main control unit 13 and the processing apparatus 11 sequentially execute processing necessary for cooking, in cooperation.

Next, the cooking area 50 preferable for the cooking system 100 functioning will be described in detail with reference to FIG. 2 and subsequent diagrams. Hereinafter, the description will be mainly given using an example of cooking buckwheat noodles, but a cooking target may be noodles (for example, wheat noodles, Chinese noodles in soup, pasta) other than buckwheat noodles, or any cooking ingredient other than noodles (cooking ingredient required to be cooked in some way).

Figure 2:
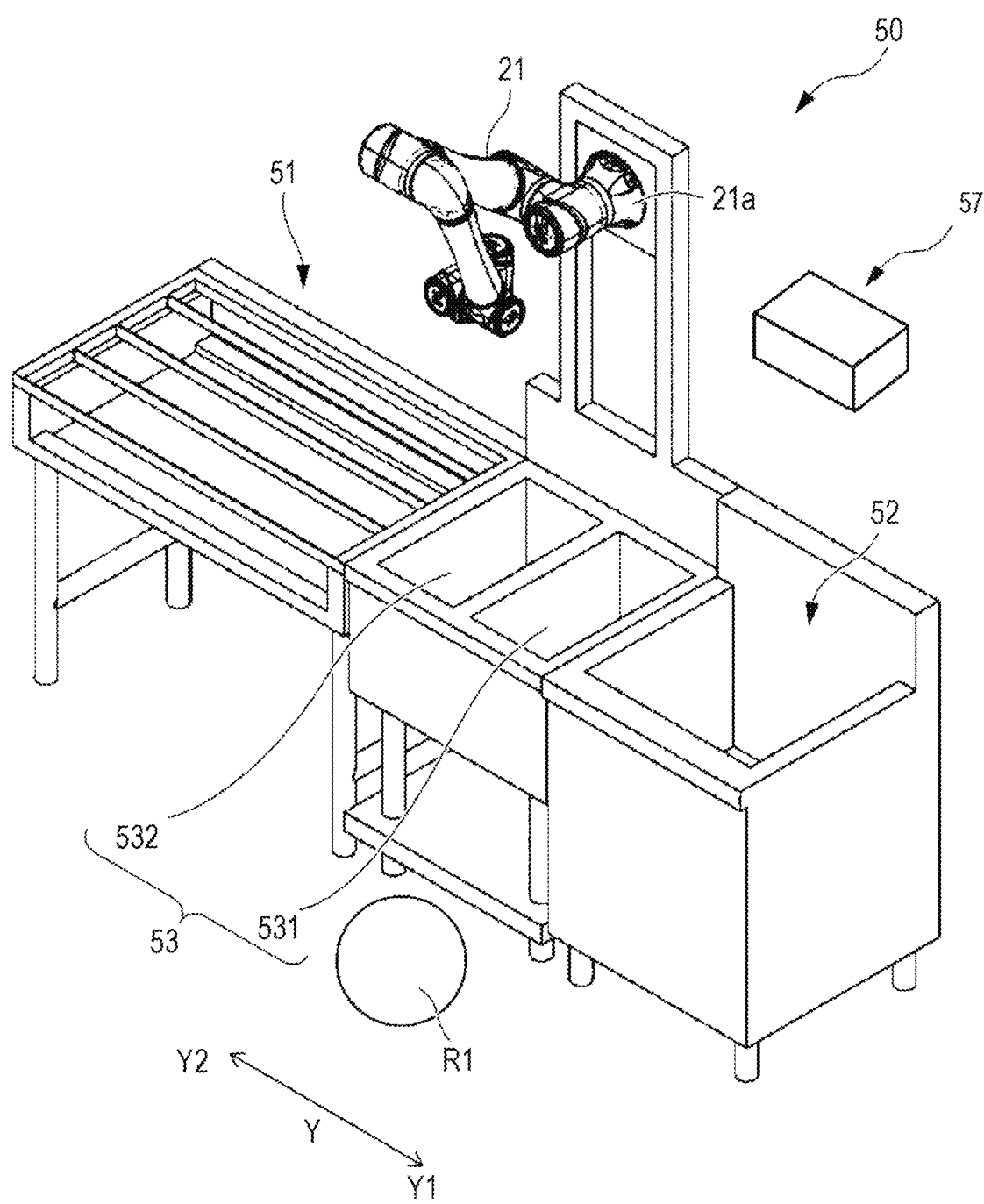
FIG. 2 is a diagram illustrating a cooking area including a plurality of sections.

FIG. 2 is a diagram illustrating the cooking area 50 including a plurality of sections. In the example illustrated in FIG. 2, the plurality of sections includes a first section 51, a second section 52, and a third section 53. In addition, the number of sections may be an arbitrary number. The third section 53 may be omitted or another section may be added.

Figure 3:
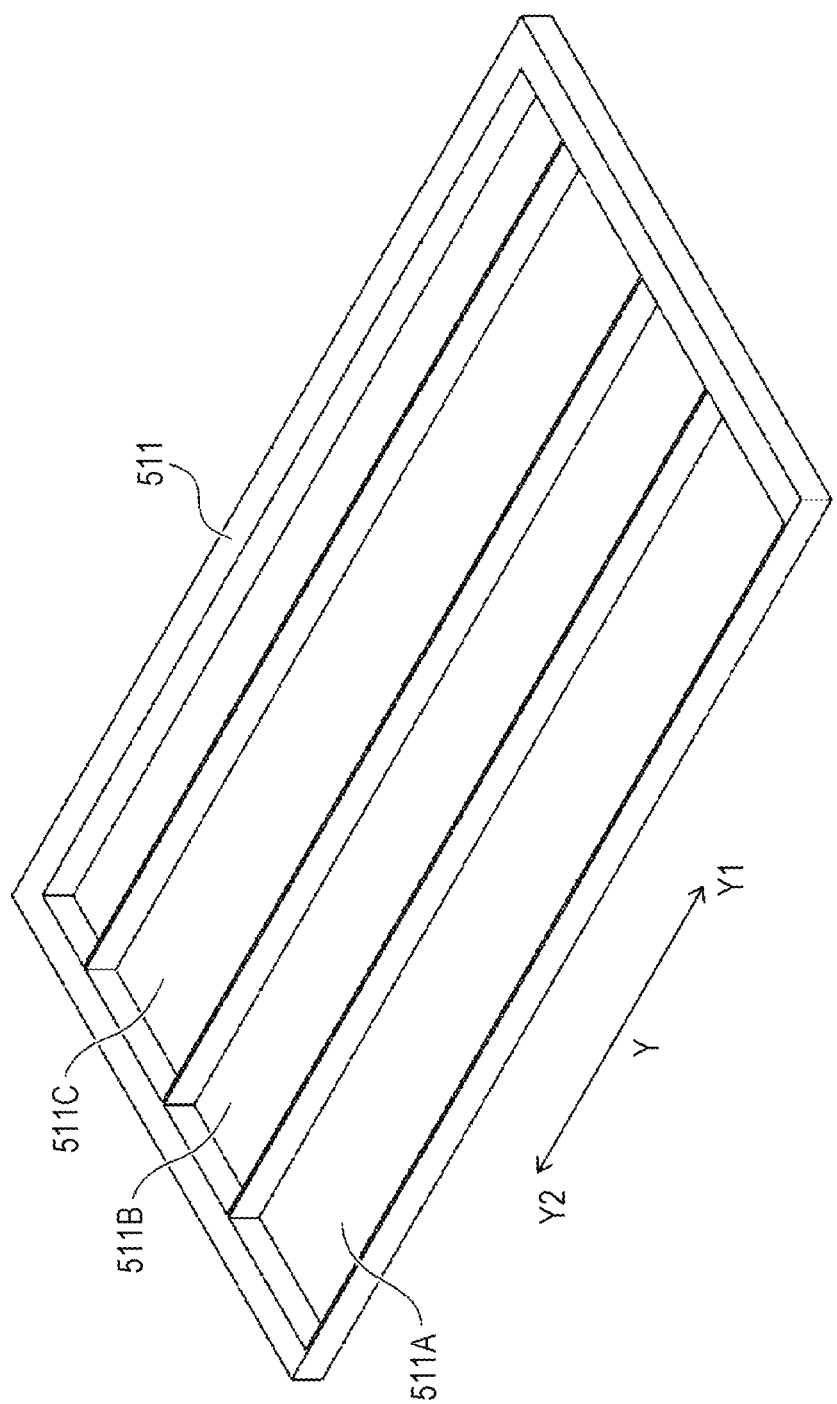
FIG. 3 is a perspective view illustrating a rail 511 arranged in a first section.

FIG. 3 is a perspective view illustrating a rail 511 arranged in the first section 51. In the first section 51, a plurality of lanes 511A, 511B, and 511C is defined by the rail 511. A tray 80 holding one or more "hand strainers (sieve baskets)" (hereinafter, will be simply referred to as a "tray 80") is placed on any of the lanes, and conveyed toward a Y direction Y1 side. In addition, the conveyance may be implemented by a manual work performed by a worker, or may be implemented by a robot other than the robot 21 or a drive mechanism. In addition, the rail 511 may be inclined in such a manner that the Y1 side becomes the downside. In this case, the tray 80 can move toward the Y direction Y1 side by the function of gravitational force.

For example, if the tray 80 holding "hand strainers (sieve baskets)" is positioned on a lane in the first section 51 at a position closest to the Y direction Y1 side, a cooking preparation start state is caused.

Figure 4:
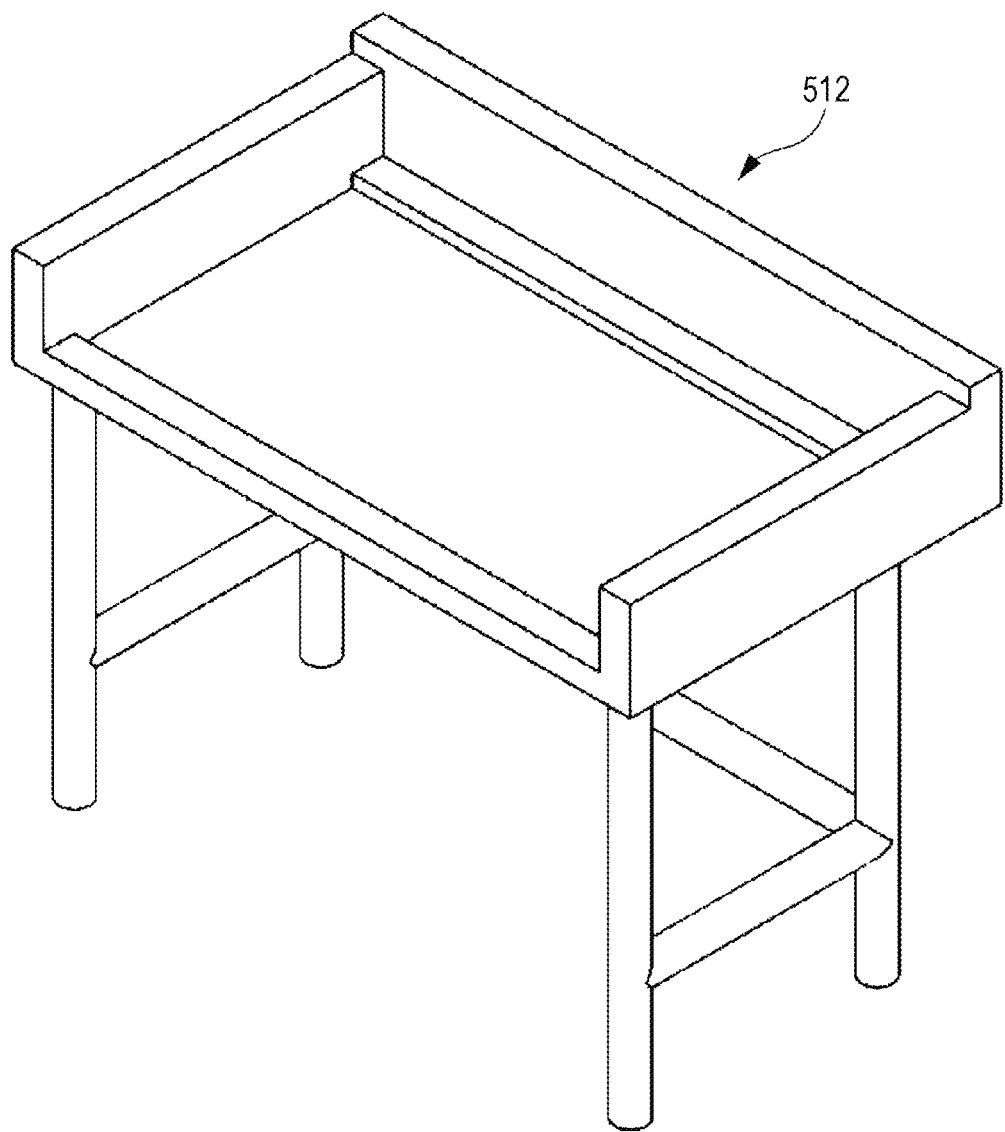
FIG. 4 is a perspective view illustrating a support rack of the rail 511.

FIG. 4 is a perspective view illustrating a support rack 512 of the rail 511. The support rack 512 can removably support the rail 511. With this structure, the maintenance of the rail 511 becomes easy.

Figure 5:
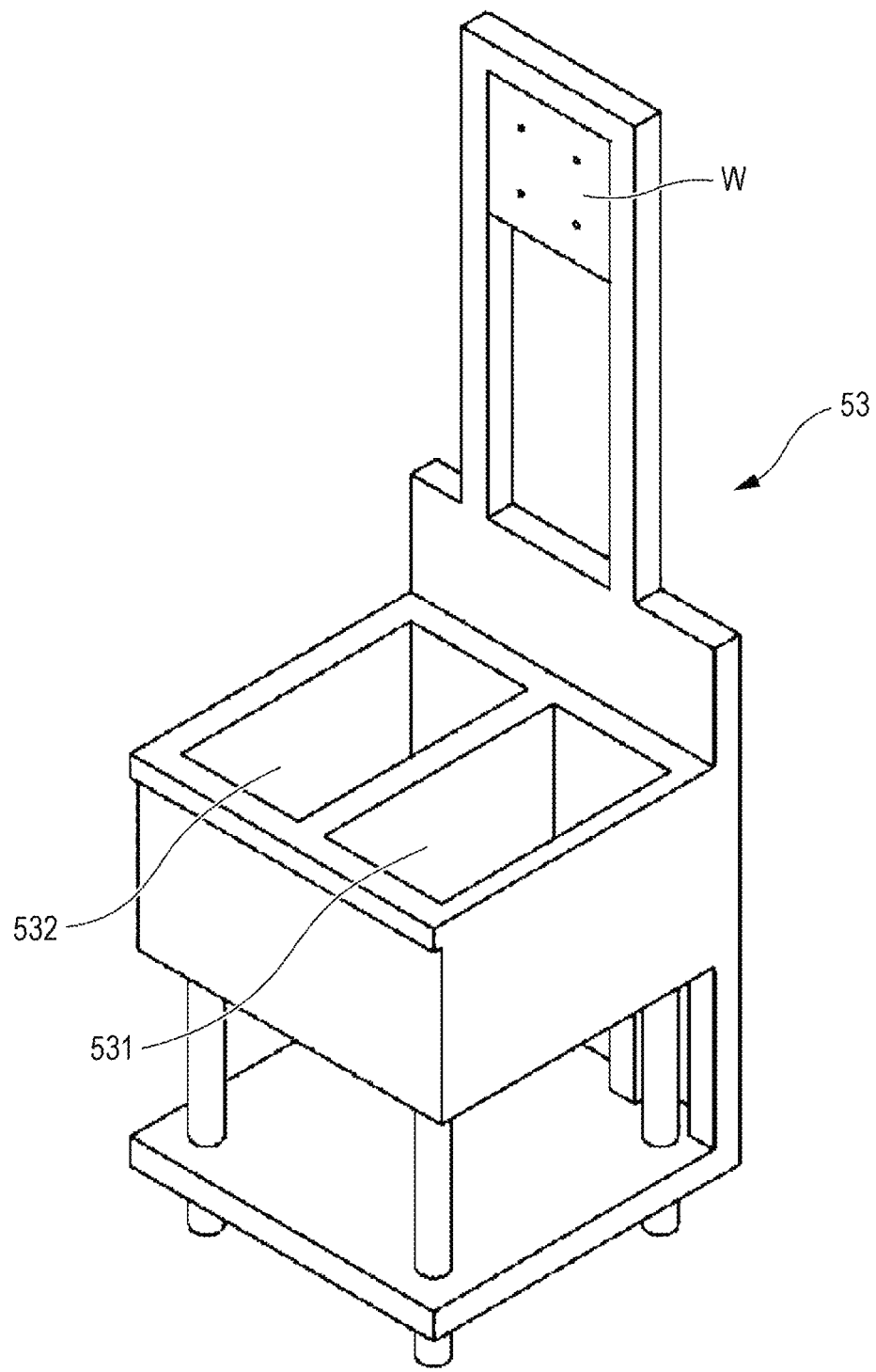
FIG. 5 is a perspective view illustrating equipment of a third section.

FIG. 5 is a perspective view illustrating equipment of the third section 53. In FIG. 5, the third section 53 includes sub-sections 531 and 532. Any works may be allocated to the sub-sections 531 and 532. For example, a draining work and a sliminess removal work.

In the present embodiment, as illustrated in FIG. 2, the robot 21 is arranged in the third section 53. More specifically, a proximal end 21a of the robot 21 is attached to a wall member W (refer to FIG. 5) of the equipment included in the third section 53. By providing the wall member W as a part of the equipment, strength sufficient for the wall member W itself and a supporting structure thereof can be ensured. Alternatively, as long as the attachment strength or the like has no problem, the proximal end 21a of the robot 21 can be attached to a wall (building wall) or a ceiling of the cooking area 50. In addition, the proximal end 21a of the robot 21 may be attached to a wall member included in the first section 51 or the second section 52, or a wall (building wall) near the proximal end 21a of the robot 21. In any case, because the robot can be arranged in an upper space in each section, it becomes possible to reduce an installation area of the entire cooking system. Nevertheless, in a case where the proximal end 21a of the robot 21 is attached to a wall in the first section 51 or the third section, the maintenance of the robot 21 becomes easier as compared with a case where the proximal end 21a of the robot 21 is arranged in the second section 52. Furthermore, a possibility of interference with a duct 57 that can be arranged in an upper space of the second section 52 is reduced, and the cooking area 50 with good space efficiency can be realized. Furthermore, as compared with a case where the proximal end 21a of the robot 21 is arranged in the first section, in a case where the proximal end 21a of the robot 21 is arranged in the third section, because a distance to the second section in which a cooking work is to be executed becomes shorter, it becomes possible for a compact robot to handle a work.

Figure 6:
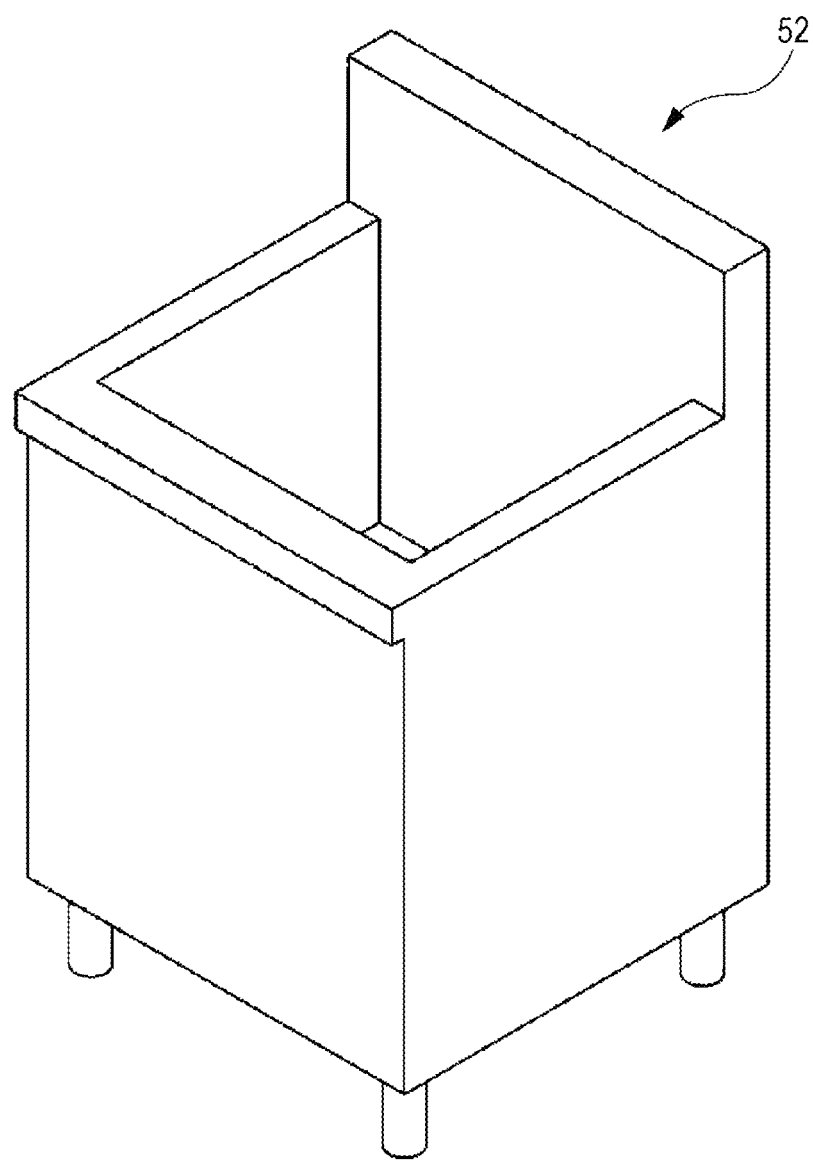
FIG. 6 is a perspective view illustrating equipment of a second section.

FIG. 6 is a perspective view illustrating equipment of the second section 52. A work of boiling buckwheat noodles is allocated to the second section 52.

Figure 7:
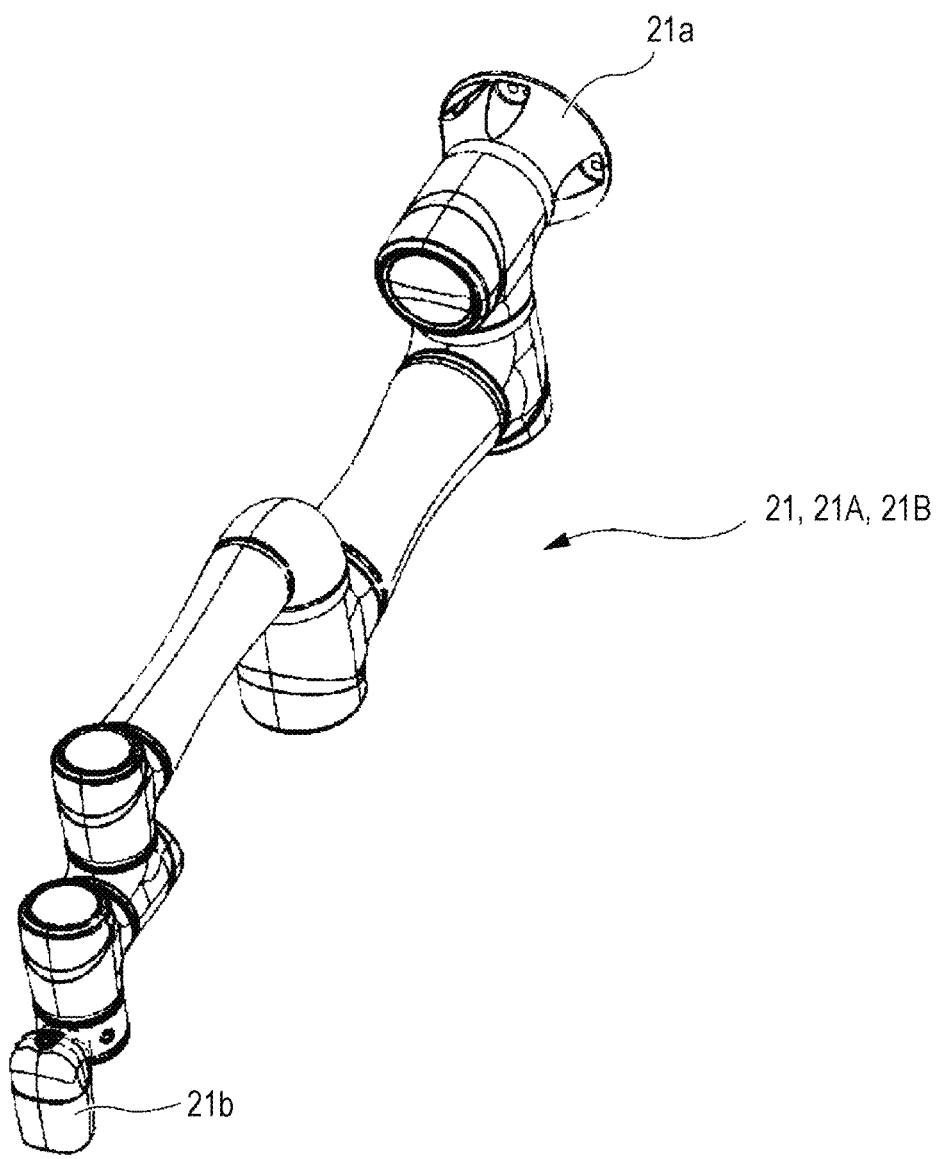
FIG. 7 is a perspective view illustrating a main body of a robot.

FIG. 7 is a perspective view illustrating a main body of the robot 21. Note that FIG. 7 illustrates the robot 21 in a state in which a hand main body portion 72 is not attached (the same applies to FIG. 2).

The robot 21 is a multijoint robot including a plurality of rotary joints, and the proximal end 21a is attached to the wall member W. Alternatively, the robot 21 including not only rotary joints but also prismatic joints can also be used as the robot 21. In the robot 21, an actuator for driving each joint is provided for a corresponding joint, and these actuators are connected to the processing apparatus 11 and controlled. A robot hand 70 (FIG. 8) is attached to a distal end 21b of the robot 21.

In the present embodiment, because the robot 21 is a multijoint robot and can be retracted toward the wall member W side, a work space above the sub-sections 531 and 532 can be effectively ensured. In this case, for example, it become possible for a worker to perform a work while standing near a region R1 illustrated in FIG. 2, and the equipment can be effectively used even when the robot 21 is not operating.

Figure 8:
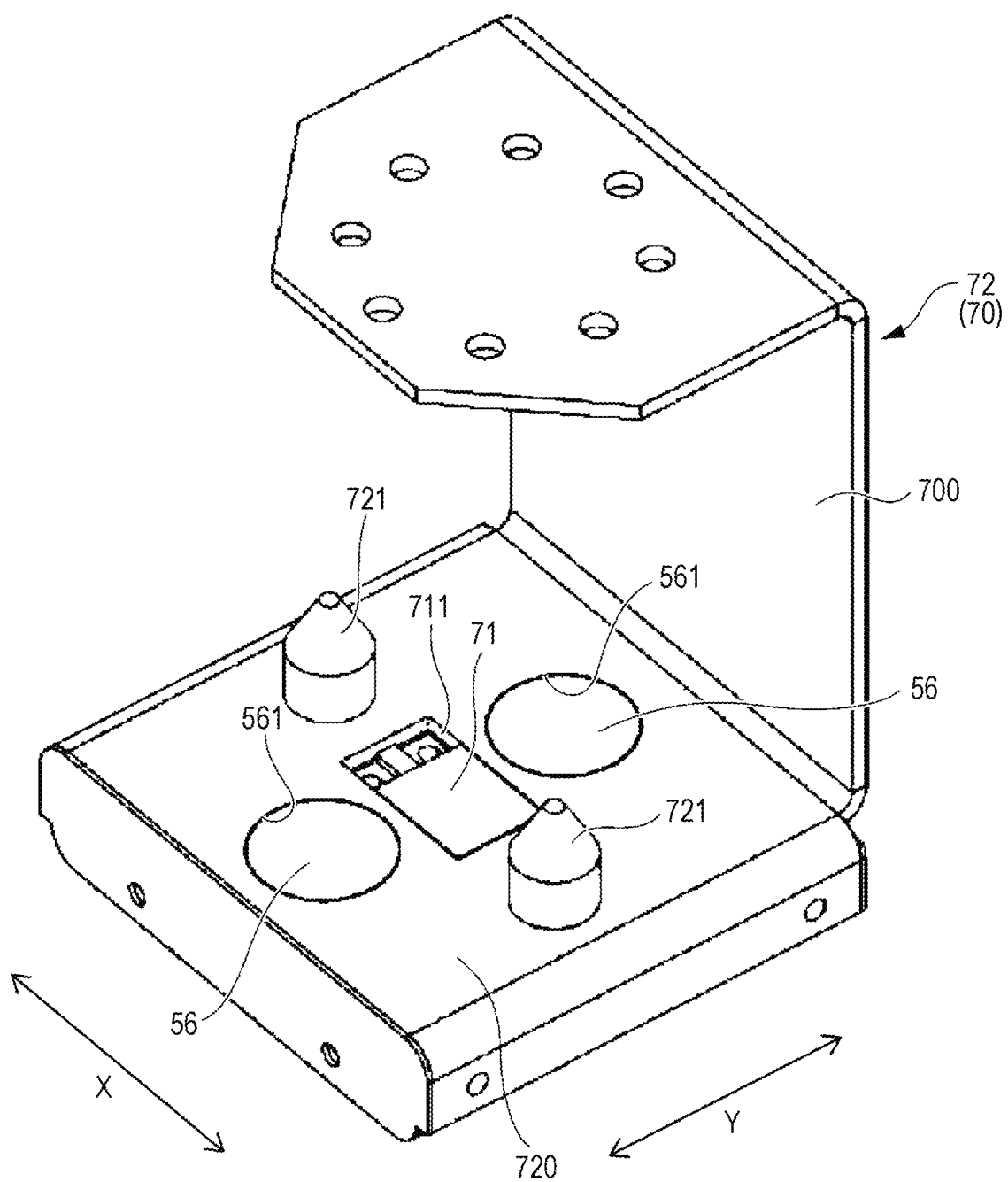
FIG. 8 is a perspective view illustrating a robot hand.
Figure 9:
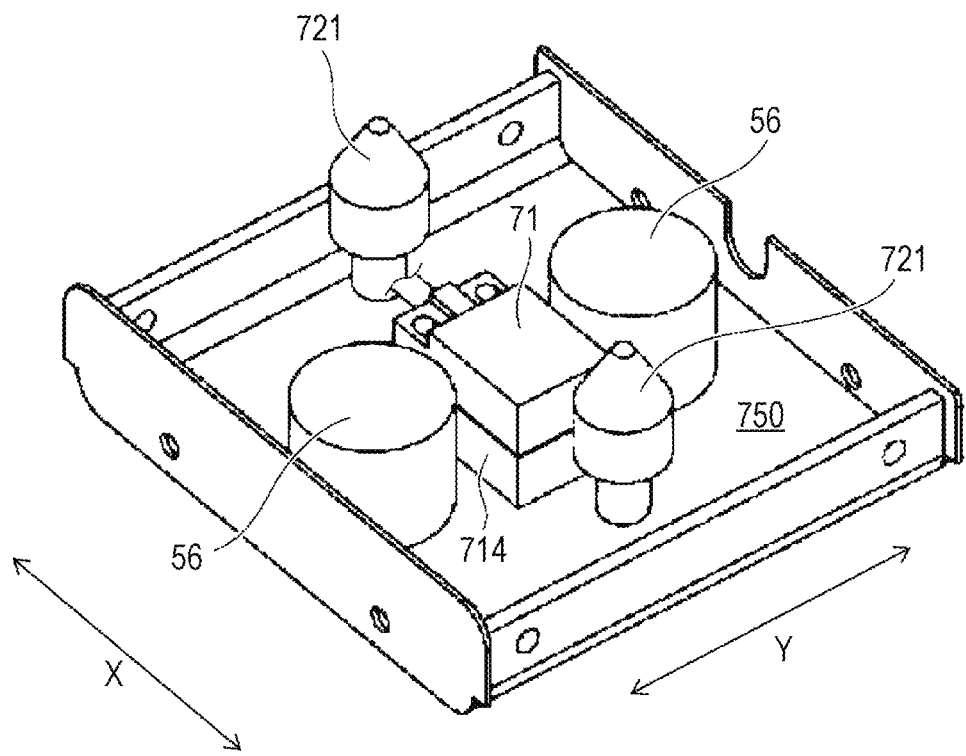
FIG. 9 is a perspective view illustrating a hand main body portion in a state in which a plate member is removed.
Figure 10:
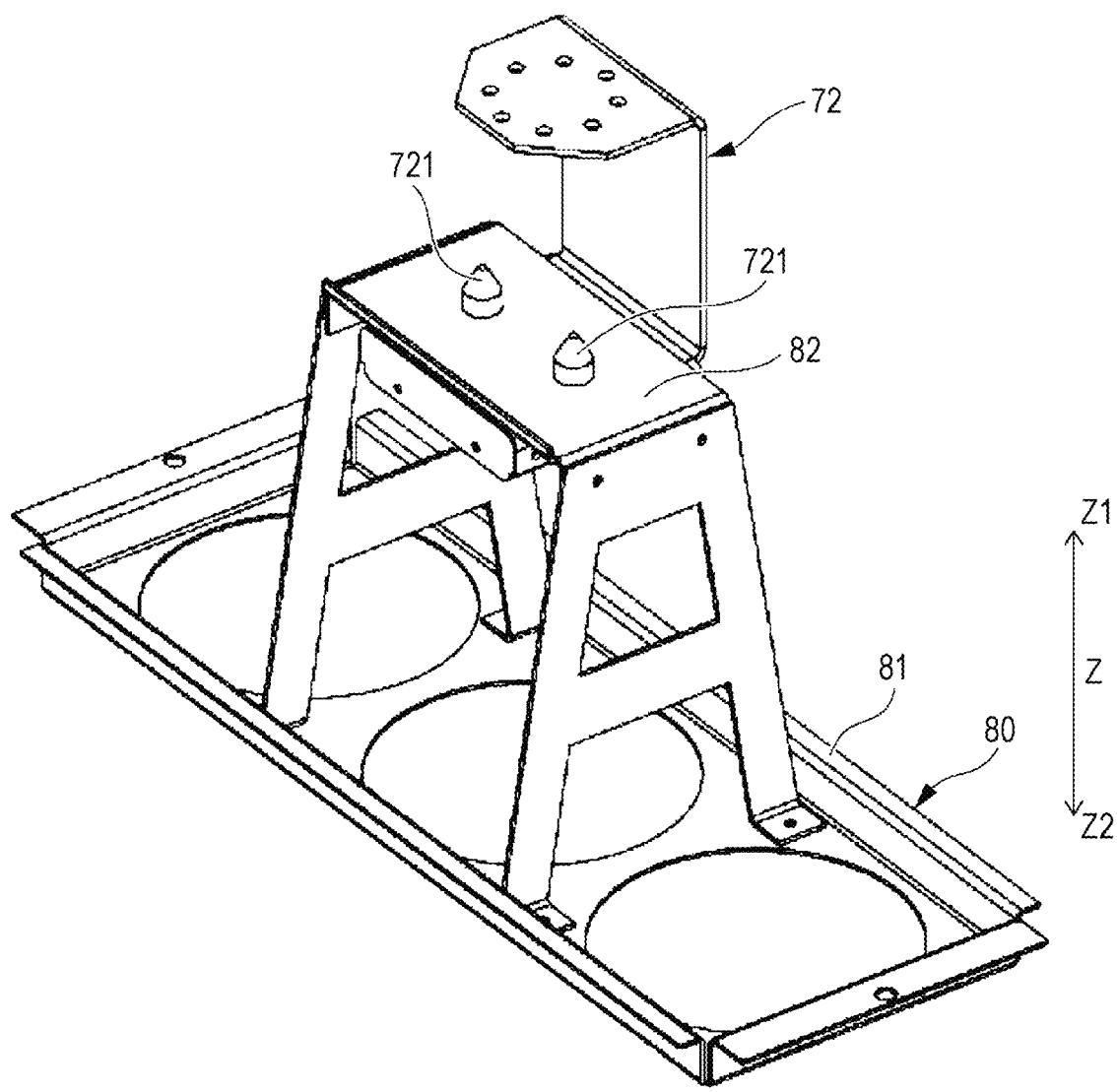
FIG. 10 is a perspective view illustrating an engaged state of the hand main body portion and a tray.
Figure 11:
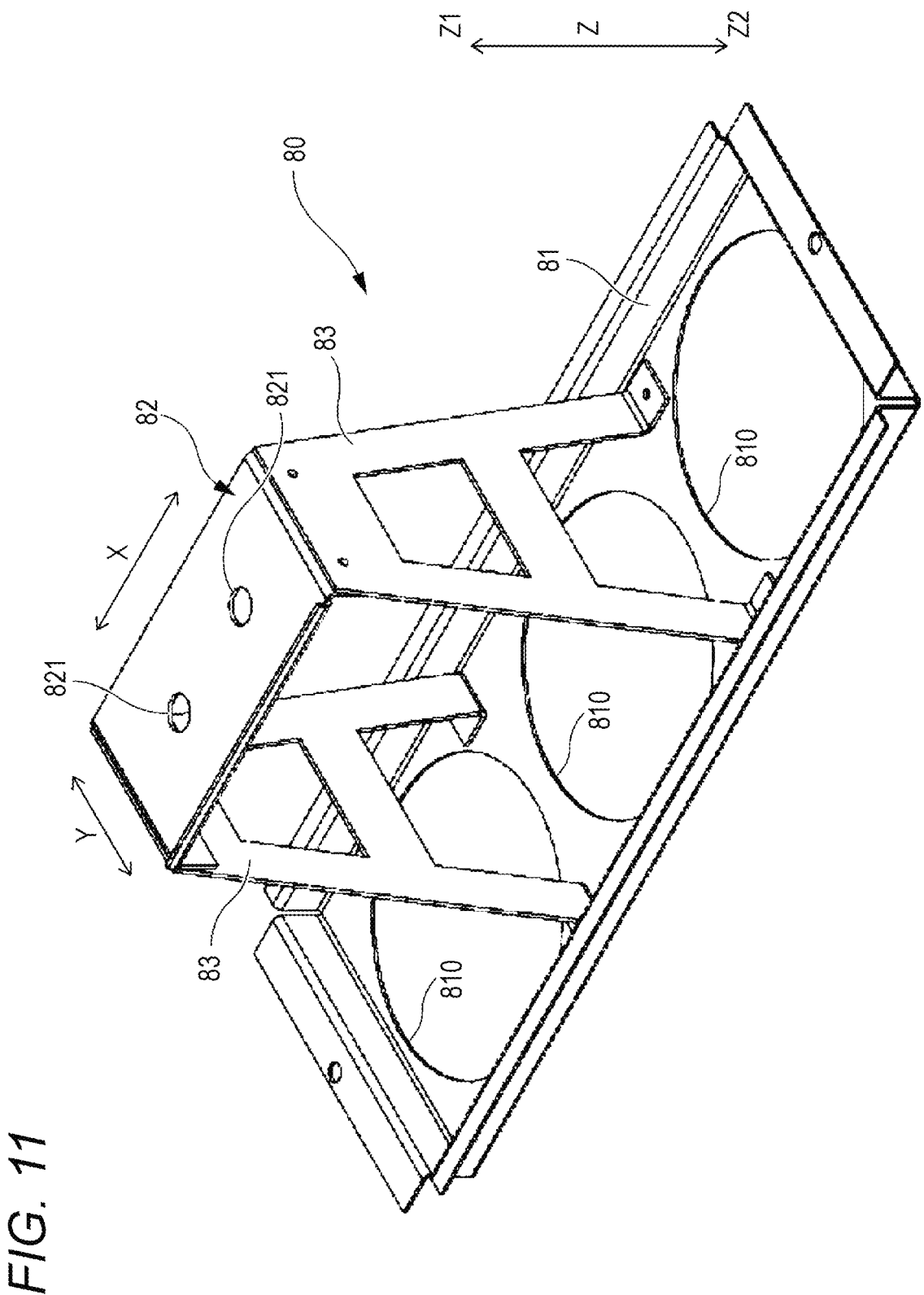
FIG. 11 is a perspective view illustrating a single state of the tray.
Figure 12:
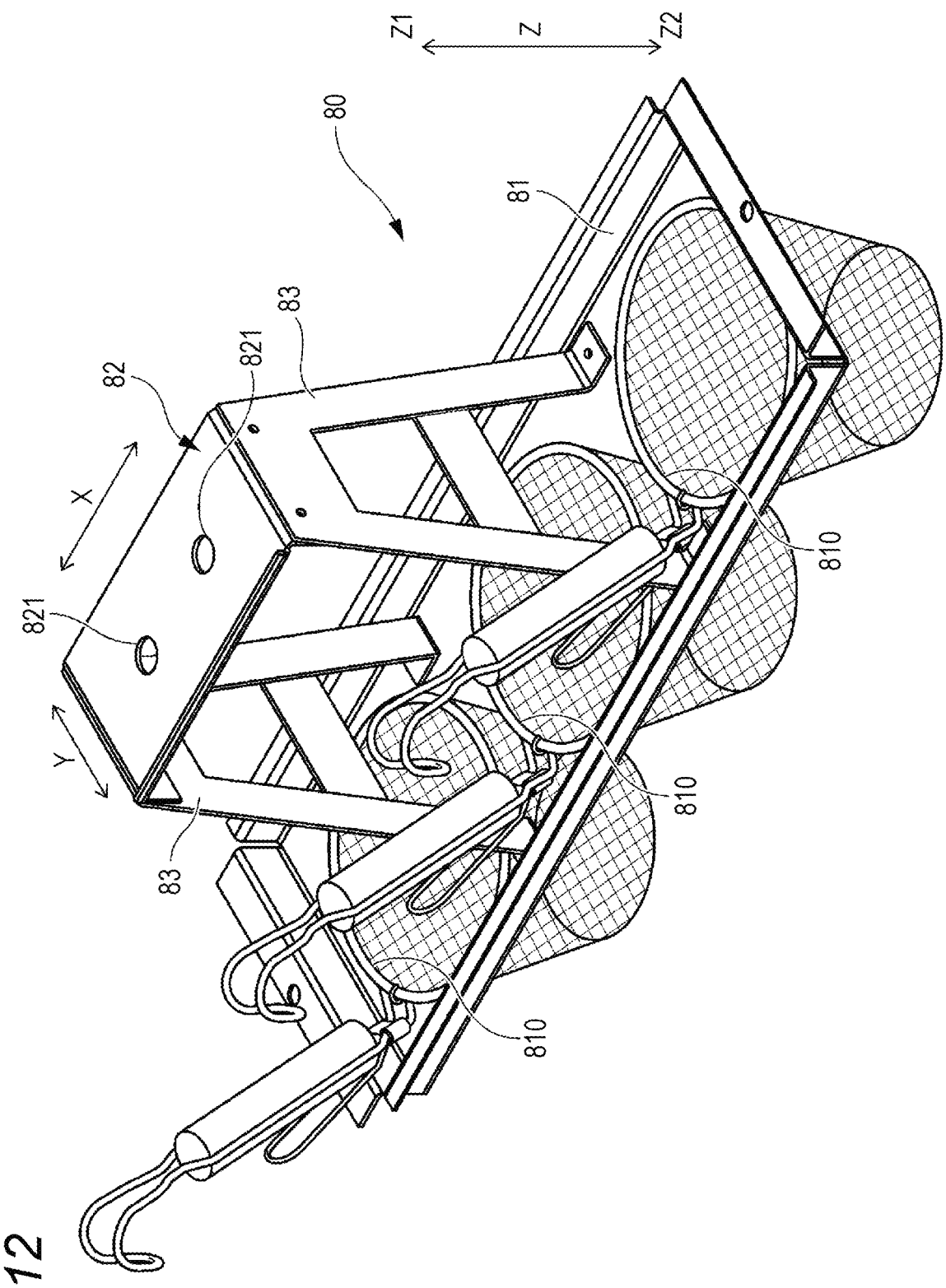
FIG. 12 is a perspective view illustrating the tray in a state of holding hand strainers.

FIG. 8 is a perspective view illustrating the hand main body portion 72 of the robot hand 70. FIG. 9 is a perspective view illustrating the hand main body portion 72 in a state in which a plate member 700 is removed. FIG. 10 is a perspective view illustrating an engaged state of the hand main body portion 72 and the tray 80. FIG. 11 is a perspective view illustrating a single state of the tray 80. FIG. 12 is a perspective view illustrating the tray 80 in a state of holding hand strainers (sieve baskets). In FIG. 8, an X direction and a Y direction are defined as mutually-perpendicular two directions with reference to a top surface 720 of the hand main body portion 72. Furthermore, in FIGS. 10 to 12, a Z direction is defined. The Z direction is a direction vertical to a support surface in a tray portion 81 of the tray 80. Hereinafter, a term related to an up-down direction (for example, top surface, bottom surface, etc.) is sometimes used assuming that a Z direction Z1 side is an "upper side" and a Z direction Z2 side is a "lower side".

The robot hand 70 is preferably formed to pick up the tray 80 and place the tray 80 at a predetermined location (the first section 51, etc.). The robot hand 70 includes the hand main body portion 72 to be engaged with the tray 80.

The hand main body portion 72 has the top surface 720 that gets surface contact with a bottom surface of a supported portion 82 of the tray 80 when the hand main body portion 72 engages with the tray 80. In FIG. 8, the hand main body portion 72 includes the plate member 700 having a U-shaped cross-section (shape viewed in the X direction), and the plate member 700 forms the top surface 720. The top surface 720 receives gravitational force of the tray 80. More specifically, the hand main body portion 72 picks up the tray 80 in such a manner as to scoop up the supported portion 82 of the tray 80. With this configuration, even in a case where the engagement reinforcement means 56 becomes nonfunctional due to an abnormality of power or the like while the tray 80 being lifted up via the hand main body portion 72, engagement between the hand main body portion 72 and the tray 80 can be maintained (i.e., dropping of the tray 80 can be prevented).

The hand main body portion 72 is provided with pins 721. The pins 721 are provided in such a manner as to protrude upward from the top surface 720, for example. The number of pins 721 may be an arbitrary number. In FIG. 8, two pins 721 are provided with being separated in the X direction near the center position in the Y direction on the top surface 720. By being inserted into corresponding holes 821 in the tray 80, the pins 721 fulfill a positioning function when the hand main body portion 72 engages with the tray 80. In addition, in a modified example, pins (for example, downward pins) may be formed on the tray 80 side, and corresponding holes may be formed on the hand main body portion 72 side.

The pins 721 may have an arbitrary cross-sectional shape, but preferably have a shape tapering toward the tip with a circular cross section. With this configuration, even in a case where a slight deviation exists between the tray 80 and the hand main body portion 72 immediately before engagement, an engaged state of them can be realized while correcting the deviation.

In the hand main body portion 72, the engagement reinforcement means 56 (schematically illustrated in FIG. 8) is provided. The engagement reinforcement means 56 is preferably provided between the pins 721 in the X direction. In addition, on the top surface 720, a hole 561 for the engagement reinforcement means 56 may be formed. With this configuration, a degree of engagement between the hand main body portion 72 and the tray 80 can be effectively increased. The number of engagement reinforcement means 56 may be an arbitrary number. In FIG. 8, two engagement reinforcement means 56 are provided with being separated in the Y direction near the center position in the X direction on the top surface 720. In the present embodiment, the engagement reinforcement means 56 is an electromagnet, and the supported portion 82 is formed by a magnetic body. With this configuration, if an electromagnet enters an on state, a degree of engagement between the hand main body portion 72 and the tray 80 increases. With this configuration, even in a case where large vibration or the like occurs due to disturbance or the like, a possibility that engagement between the hand main body portion 72 and the tray 80 can be maintained can be increased.

In the hand main body portion 72, the signal generation unit 71 (schematically illustrated in FIG. 8) is provided. The signal generation unit 71 is provided within a region on the top surface 720 that gets surface contact with the bottom surface of the supported portion 82 of the tray 80. In addition, on the top surface 720, a hole 711 for the signal generation unit 71 may be formed. The signal generation unit 71 detects a proximity state of the supported portion 82 with respect to the hand main body portion 72. In the present embodiment, the signal generation unit 71 generates a predetermined signal indicating a proximity state, in a case where a distance in the Z direction between the top surface 720 of the hand main body portion 72 and the bottom surface of the supported portion 82 of the tray 80 becomes equal to or smaller than a threshold value. The signal generation unit 71 may be a proximity sensor, for example.

In addition, the hand main body portion 72 preferably includes a mounting space 750 below the top surface 720 as illustrated in FIG. 9. Note that FIG. 9 illustrates the robot hand 70 in a state in which the plate member 700 having the U-shaped cross-section (shape viewed in the X direction)

and forming the top surface 720 is removed. Lower portions of the pins 721, the engagement reinforcement means 56, the signal generation unit 71, cables, and the like may be arranged within the mounting space 750. In addition, FIG. 9 illustrates a spacer 714 for arranging the signal generation unit 71 at an appropriate position.

In the present embodiment, a state in which the tray 80 is engaged with the hand main body portion 72 is a first engaged state (refer to FIG. 10). At this time, the engagement reinforcement means 56 does not function or is faint. In addition, in a case where the engagement reinforcement means 56 is an electromagnet, in a case where current (or magnetic force) supplied for causing a second engaged state is 100, "faint" means that current is significantly smaller than 100. For example, the current is equal to or smaller than 50 and preferably equal to or smaller than 10. Then, if the engagement reinforcement means 56 functions, the second engaged state in which a degree of engagement between the hand main body portion 72 and the tray 80 increases may be caused. Transition (switch) from the first engaged state to the second engaged state is implemented by the processing apparatus 11. Specifically, as described above, in a case where the signal generation unit 71 is a proximity sensor, for example, the proximity sensor generates a predetermined signal in a case where the first engaged state of the tray 80 with respect to the hand main body portion 72 is detected. The processing apparatus 11 implements transition (switch) from the first engaged state to the second engaged state being triggered by the generation of the predetermined signal. Note that the signal generation unit 71 is preferably configured not to generate the predetermined signal in an engaged state in which positioning is not performed via the pins 721. More specifically, the signal generation unit 71 preferably generates the predetermined signal only in a case where an engaged state in which positioning is performed via the pins 721 is detected.

In addition, in the first engaged state and the second engaged state, a positional relationship between the robot hand 70 and the tray 80 is the same, and is in the state illustrated in FIG. 10.

In addition, the transition (switch) from the first engaged state to the second engaged state may be implemented in a state in which gravitational force of the tray 80 acts on the top surface 720 of the hand main body portion 72. Note that, in this case, the signal generation unit 71 may be a sensor or the like that detects the acting state of the gravitational force.

As illustrated in FIG. 11, the tray 80 includes the tray portion 81, the supported portion 82, and leg portions 83.

The tray portion 81 includes through-holes 810 into which "hand strainers (sieve baskets)" are to be inserted. The number of through-holes 810 may be an arbitrary number. In FIG. 11, three through-holes 810 are provided. "Hand strainers (sieve baskets)" to be inserted into the through-holes 810 are supported by rim portions around the through-holes 810.

As described above, the supported portion 82 is a portion to be engaged with the hand main body portion 72. The supported portion 82 forms a bottom surface that gets surface contact with the top surface 720 of the hand main body portion 72. The supported portion 82 includes the holes 821 into which the pins 721 of the hand main body portion 72 are to be inserted (fitted).

The leg portions 83 support the supported portion 82 in such a manner as to be positioned above the tray portion 81. A pair of leg portions 83 are provided, and upper end portions are connected to rim portions on both sides in the X direction of the supported portion 82. Furthermore, lower end portions of the leg portions 83 are fixed to the top surface of the tray portion 81. By providing such leg portions 83, the supported portion 82 can be supported above the tray portion 81 in such a manner that a portion forming the top surface 720 of the hand main body portion 72 can be positioned below the supported portion 82.

In the present embodiment, the tray 80 prepared in the first section 51 holds "hand strainers (sieve baskets) containing uncooked buckwheat noodles as schematically illustrated in FIG. 12. The robot 21 picks up the tray 80 on the first section 51, conveys the tray 80 up to the second section 52 (moves the tray 80 in the air), and immerses the buckwheat noodles together with the tray 80 into hot water prepared in the second section 52. A boiling work (an example of first cooking processing) can be thereby implemented. If the boiling work is started, the robot 21 may once dissolve the engagement with the tray 80. In this case, another work can also be implemented until the boiling work ends. Subsequently, if a predetermined time elapses from when the boiling work is started, the robot 21 picks up the tray 80 in the second section 52, and performs postprocessing (an example of second cooking processing) in the third section 53. More specifically, the robot 21 first removes sliminess of buckwheat noodles by immersing the tray 80 into cold water stored in the sub-section 531. In addition, at this time, the robot 21 may enhance work efficiency by moving the tray 80 or the like. Furthermore, the cooking area 50 may have a configuration in which cold water is poured upon detection of the tray 80 in the sub-section 531. Subsequently, the robot 21 carries the tray 80 onto the sub-section 532 and performs a draining work. At this time, the robot 21 may effectively implement draining by vertically vibrating the tray 80 with an inclination. If the robot 21 ends the draining work, the robot 21 conveys the tray 80 to the first section 51, and places the tray 80 onto the rail 511 on the first section 51. In addition, at this time, a lane onto which the tray 80 is to be placed may be defined. In this manner, a series of cooking works is implemented.

In this manner, according to the present embodiment, the movement of the tray 80 in a series of cooking works becomes a movement of being conveyed from an end portion on a Y direction Y2 side in the cooking area 50 up to an end portion on the Y direction Y1 side, and then returning to the Y direction Y2 side. More specifically, the movement is a reciprocating bidirectional movement.

Meanwhile, in the case of a comparative example of implementing a series of cooking works only by a unidirectional movement of the tray 80 from an end portion on the Y direction Y2 side in the cooking area 50 to an end portion on the Y direction Y1 side, it is necessary to arrange a section related to the boiling work (in this example, the second section 52), on the Y direction Y2 side of a section for performing a work after boiling (in this example, the third section 53). In this case, the necessity of the robot 21 being arranged in the section related to the boiling work (center section) becomes higher. If the robot 21 is arranged in the section related to the boiling work, the durability of the robot 21 can worsen by being exposed to steam or the like that is generated in the boiling work, and the possibility of interference with duct 57 increases.

In contrast to this, according to the present embodiment, because a series of cooking works can be implemented by the reciprocating bidirectional movement, the robot 21 can be arranged in association with the section (i.e., the third section 53) for performing the postprocessing. With this configuration, the durability of the robot 21 becomes good, and a freedom degree of routing of a duct can be increased.

Second Embodiment

Hereinafter, the second embodiment will be described. In the drawings, components substantially identical to those in the first embodiment are assigned the identical reference signs.

Figure 13:
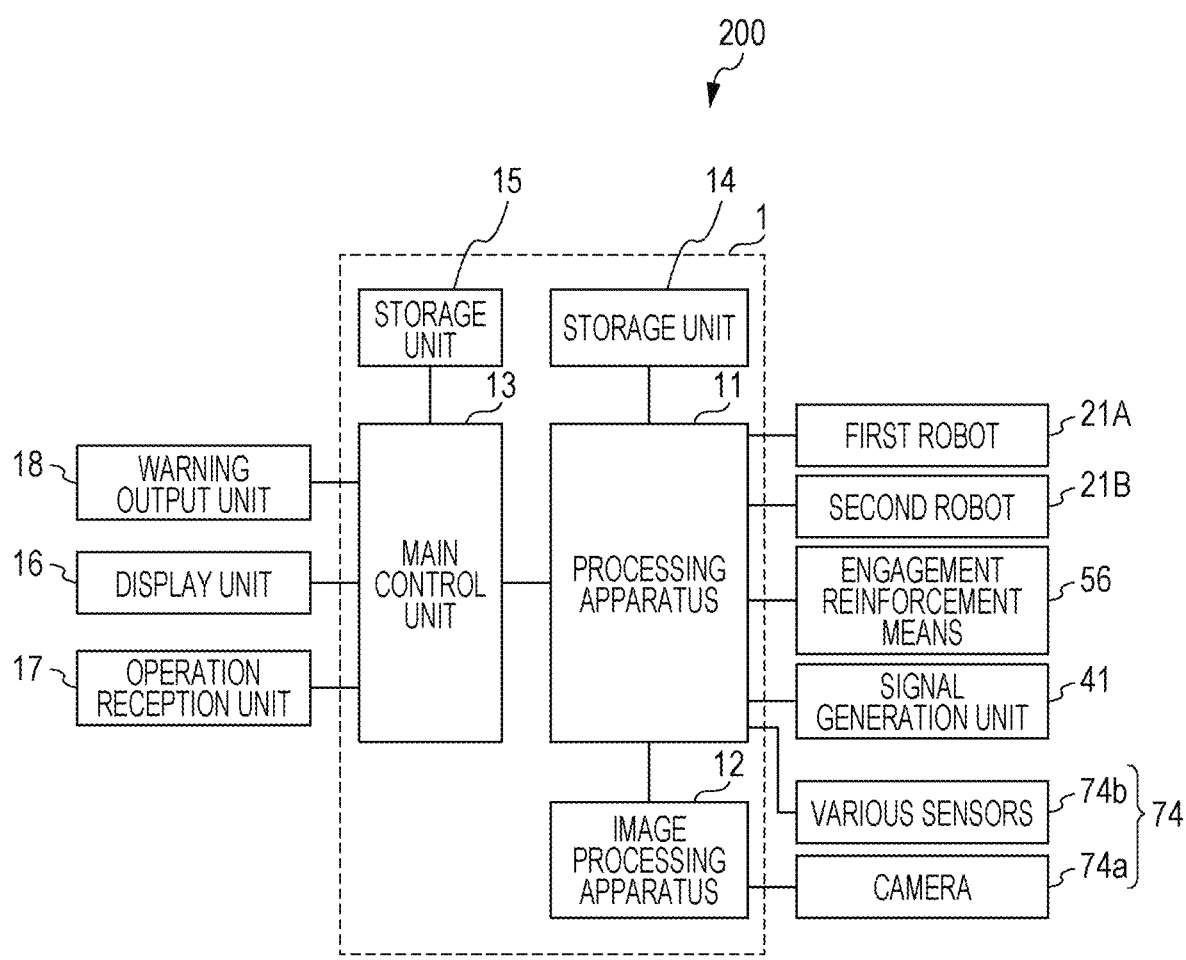
FIG. 13 is a diagram illustrating a configuration of a cooking system according to a second embodiment.

FIG. 13 is a diagram illustrating a configuration of a cooking system 200. The cooking system 200 includes a control device 1. In addition, the control device 1 may be implemented by one or more computers. In this case, the one or more computers may include a server computer.

As illustrated in FIG. 13, the control device 1 of the present embodiment includes a processing apparatus 11 that controls operations of a robot 21A (first robot) and a robot 21B (second robot) each serving as a work device, an image processing apparatus 12 that processes an image obtained by a camera 74a that captures an image of a cooking area 150, a main control unit 13, a storage unit 14 storing programs defining processing in the processing apparatus 11, and data necessary for control of the processing apparatus 11, and a storage unit 15 storing programs defining processing in the main control unit 13, and data necessary for control of the main control unit 13. Functions of the control device 1 that are to be described below can be implemented by the processing apparatus 11 and/or the main control unit 13 executing one or more programs stored in the storage unit 14 and/or the storage unit 15. The storage unit 14 and the storage unit 15 may each comprise a memory. In addition, the storage unit 14 and the storage unit 15 may be implemented by a common storage device or each may be a separate storage device. Furthermore, the image processing apparatus 12 is a single graphics processing unit (GPU), for example, but may be implemented by a processing apparatus (processing apparatus including a GPU) different from the processing apparatus 11.

The control device 1, processing apparatus 11 and/or main control unit 13 may also be encompassed by or is a component of control circuitry and/or processing circuitry. The functionality of the elements disclosed herein may be implemented using circuitry or processing circuitry which includes general purpose processors, special purpose processors, integrated circuits, ASICs ("Application Specific Integrated Circuits"), conventional circuitry and/or combinations thereof which are configured or programmed to perform the disclosed functionality. Processors are considered processing circuitry or circuitry as they include transistors and other circuitry therein. The processor may be a programmed processor which executes a program stored in a memory. In the disclosure, the circuitry, units, or means are hardware that carry out or are programmed to perform the recited functionality. The hardware may be any hardware disclosed herein or otherwise known which is programmed or configured to carry out the recited functionality. When the hardware is a processor which may be considered a type of circuitry, the circuitry, means, or units are a combination of hardware and software, the software being used to configure the hardware and/or processor.

Furthermore, a display unit 16 that displays an operating state or the like of the control device 1, an operation reception unit 17 that receives an operation of a worker or the like, and a warning output unit 18 are connected to the main control unit 13. The main control unit 13 may output an advice or a warning to a user (worker) via the display unit 16 or the warning output unit 18.

Furthermore, the processing apparatus 11 controls engagement reinforcement means 56. The engagement reinforcement means 56 is an electromagnet, for example, but may be a negative pressure generation device or the like that generates suction power (negative pressure), or may be a combination of these.

Furthermore, the processing apparatus 11 controls the engagement reinforcement means 56 based on information from a signal generation unit 41. The signal generation unit 41 may be a proximity sensor, a pressure sensor, an image sensor, or the like, for example.

Furthermore, the processing apparatus 11 is connected to a plurality of sensors 74 arranged in the cooking area 150. The plurality of sensors 74 includes the camera 74a (image sensor) and the other various sensors 74b, and includes a function of detecting a state of the cooking area 150. In addition, two or more cameras 74a may be provided.

The main control unit 13 and the processing apparatus 11 sequentially execute processing necessary for cooking, in cooperation.

Next, the cooking area 150 preferable for the cooking system 200 functioning will be described in detail with reference to FIG. 14 and subsequent diagrams. Hereinafter, the description will be mainly given using an example of cooking buckwheat noodles, but a cooking target may be noodles (for example, wheat noodles, Chinese noodles in soup, pasta) other than buckwheat noodles, or any cooking ingredient other than noodles (cooking ingredient required to be cooked in some way).

Figure 14:
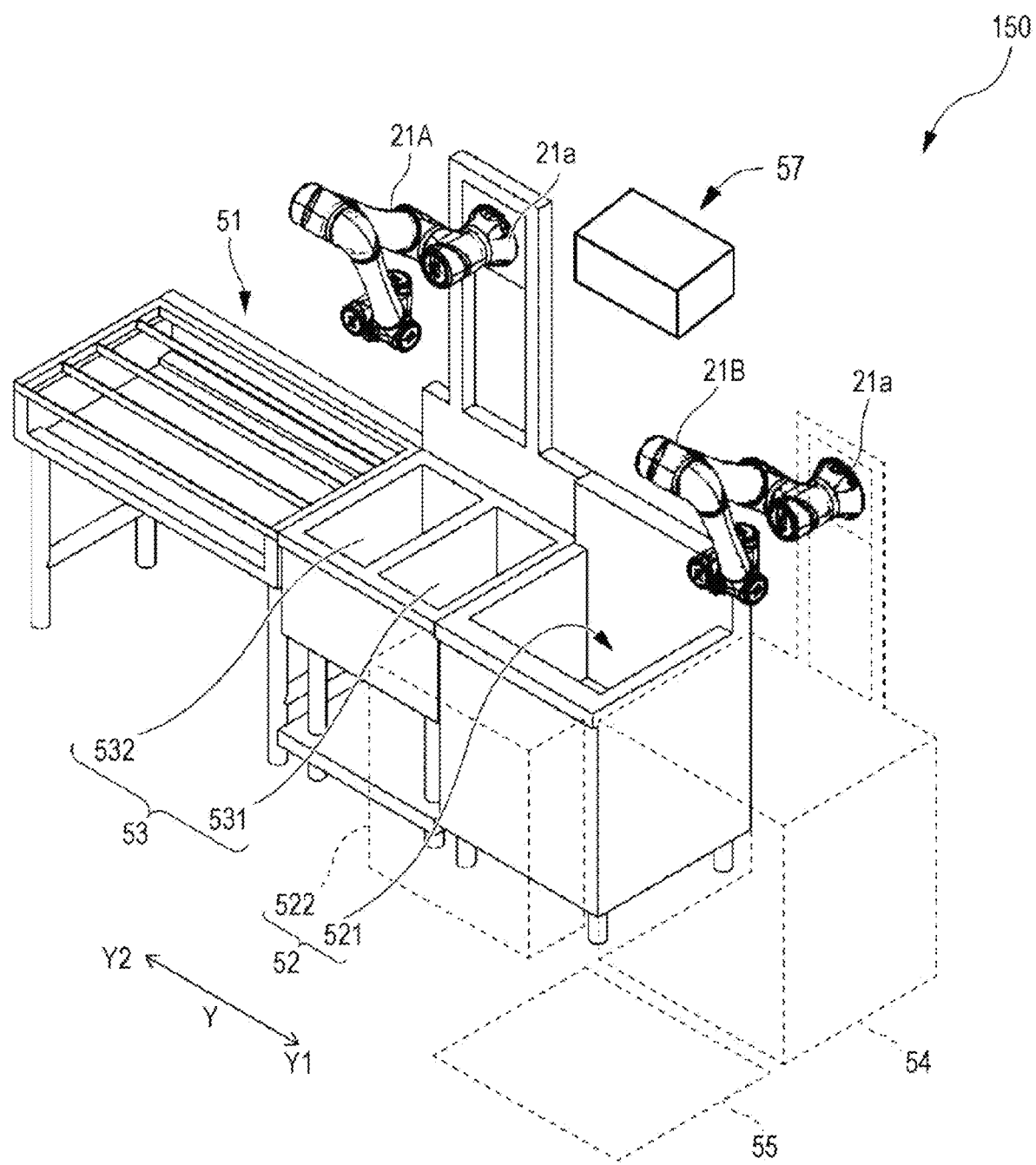
FIG. 14 is a diagram illustrating a cooking area including a plurality of sections.
Figure 15:
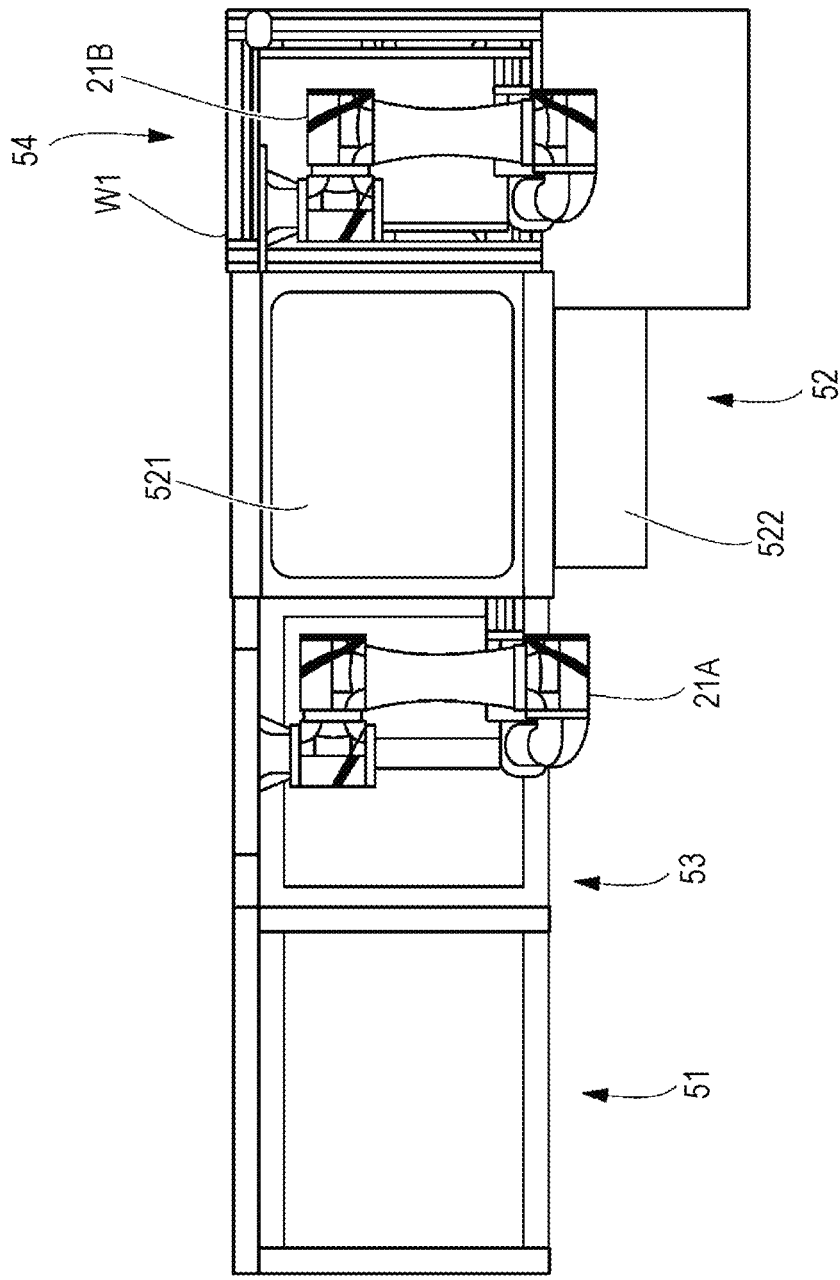
FIG. 15 is a top view illustrating a cooking area.

FIG. 14 is a diagram illustrating the cooking area 150 including a plurality of sections, and FIG. 15 is a top view illustrating the cooking area 150.

In the example illustrated in FIG. 14, the plurality of sections includes a first section 51, a second section 52, a third section 53, and a fourth section 54. In addition, the number of sections may be an arbitrary number, and another section may be added.

As illustrated in FIG. 14, the second section 52 includes a sub-section 521 and a sub-section 522. A process for boiling buckwheat noodles is allocated to the sub-section 521. The sub-section 522 functions as a placement rack for temporarily placing a tray 60. In addition, the configuration of the sub-section 522 may be an arbitrary configuration. For example, the rail 511 arranged in the first section 51 or a structural object similar to this may be arranged, and a lane similar to the lane in the first section 51 for placing the tray 60 may be formed.

In FIG. 14, the third section 53 includes sub-sections 531 and 532. Any works may be allocated to the sub-sections 531 and 532. For example, a draining work and a sliminess removal work. Buckwheat noodles boiled in the sub-section 521 can be postprocessed in the order of the sub-section 531 and the sub-section 532. For example, in the sub-section 531, a work of removing sliminess of buckwheat noodles can be mainly performed, and furthermore, in the sub-section 532, a work of tightening (cooling) buckwheat noodles in water can be performed. In this case, while water temperature in the sub-section 532 is required to be made as low as possible, water temperature in the sub-section 531 needs not be made extremely low. Thus, low-temperature cold water may be supplied only to the sub-section 532. In this case, by setting a water level in the sub-section 531 to be lower than a water level in the sub-section 532, water overflowing from the sub-section 532 exceeding the water level of the sub-section 532 may be naturally supplied to the sub-section 531. With this configuration, cold water supplied to the sub-section 532 can be effectively used also in the sub-section 531. Furthermore, it becomes unnecessary to directly supply water to the sub-section 531.

In the present embodiment, as illustrated in FIG. 14, the robot 21A is arranged in the third section 53. More specifically, a proximal end 21a of the robot 21A is attached to a wall member W (refer to FIG. 5) of the equipment included in the third section 53.

Furthermore, as illustrated in FIG. 15, in the present embodiment, the robot 21B is arranged in the fourth section 54. More specifically, a proximal end 21a of the robot 21B is attached to a wall member W1 (refer to FIG. 15) of equipment included in the fourth section 54. In addition, the proximal end 21a of the robot 21B is provided in a section closer to the fourth section than at least the proximal end 21a of the robot 21A, and in any case, it is possible to arrange the robot in a space above each section while suppressing interference with the robot 21, and it becomes possible to reduce an installation area of the entire cooking system. Nevertheless, by attaching the robot 21B to a wall in the fourth section 54 as illustrated in FIG. 14, it becomes easier to execute an operation of the robot 21B, which will be described below. By the robot 21B being provided not in the second section 52 but in the fourth section 54, the mounting of an exhaust air duct 57 or the like in the second section 52 becomes easier. Furthermore, it is possible to prevent steam generated in the second section 52 (steam generated in boiling), from being directly emitted onto the robot 21B. In addition, the robot 21B may be arranged in another location such as the second section 52. By providing the wall member W and the wall member W1 as a part of the equipment, sufficient strength of the wall member W and the wall member W1 themselves, and supporting structures thereof can be ensured. Alternatively, as long as the attachment strength or the like has no problem, the proximal end 21a of the robot 21A or the robot 21B can also be attached to a wall (building wall) or a ceiling of the cooking area 50.

The fourth section 54 illustrated in FIG. 14 functions as a placement rack for placing a container (food tray) storing buckwheat noodles.

The robot 21A and the robot 21B have the same configurations as the robot 21 illustrated in FIG. 7.

More specifically, the robots 21A and 21B are multijoint robots each including a plurality of rotary joints. In addition, robots including not only rotary joints but also prismatic joints can also be used as the robots 21A and 21B. In the robots 21A and 21B, an actuator for driving each joint is provided for a corresponding joint, and these actuators are connected to the processing apparatus 11 and controlled. In the present embodiment, a robot hand 40 is attached to a distal end 21b of the robot 21A. Furthermore, a robot hand 30 is attached to a distal end 21b of the robot 21B.

In the present embodiment, because the robots 21A and 21B are multijoint robots and can be retracted toward the sides of wall members W and W1, for example, a work space above the sub-sections 531 and 532 can be effectively ensured. In this case, for example, it become possible for a worker to perform a work in the cooking area 150, and the equipment can be effectively used even when the robots 21A and 21B are not operating.

Figure 16:
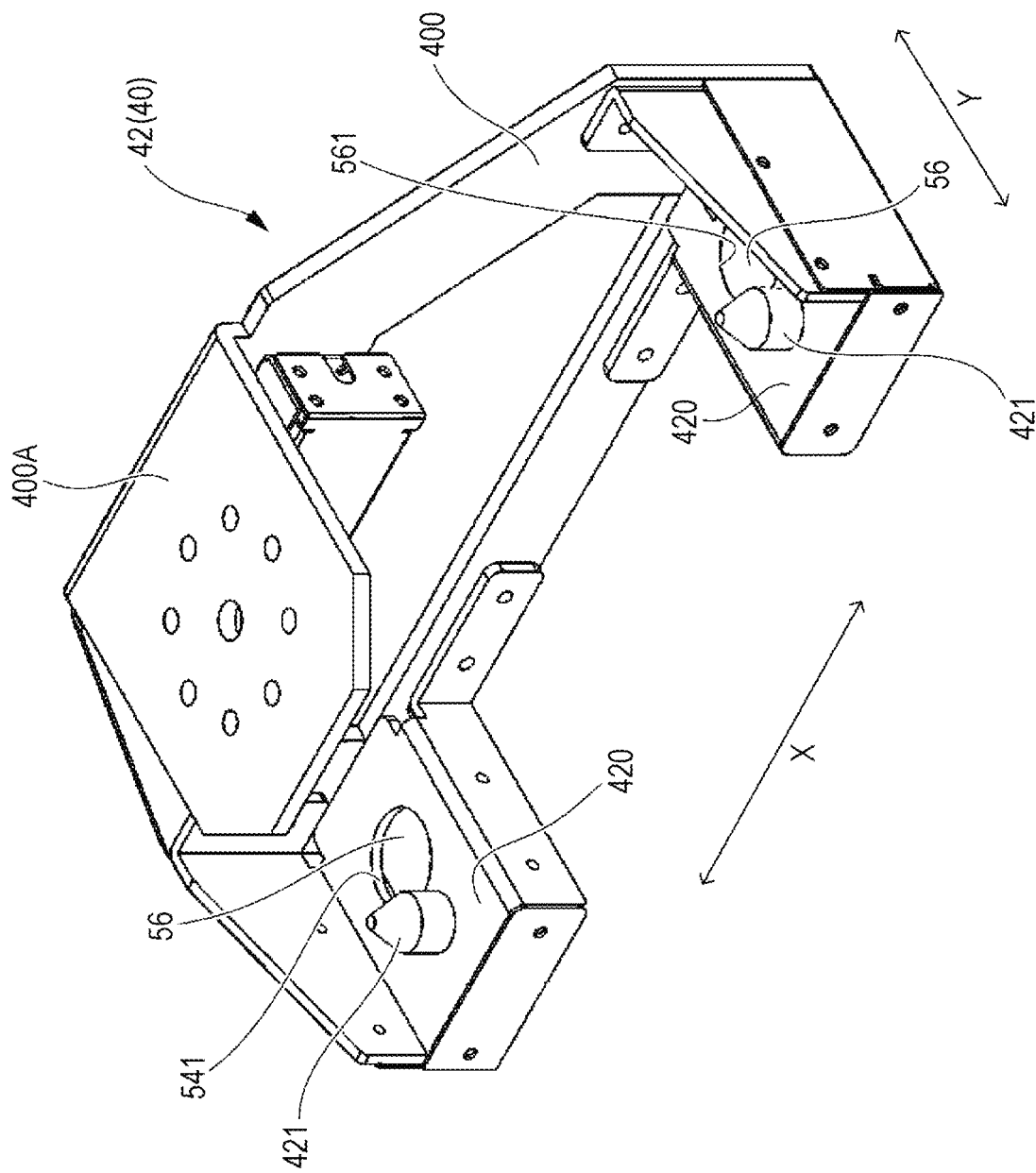
FIG. 16 is a perspective view illustrating a hand main body portion of a robot hand.
Figure 17:
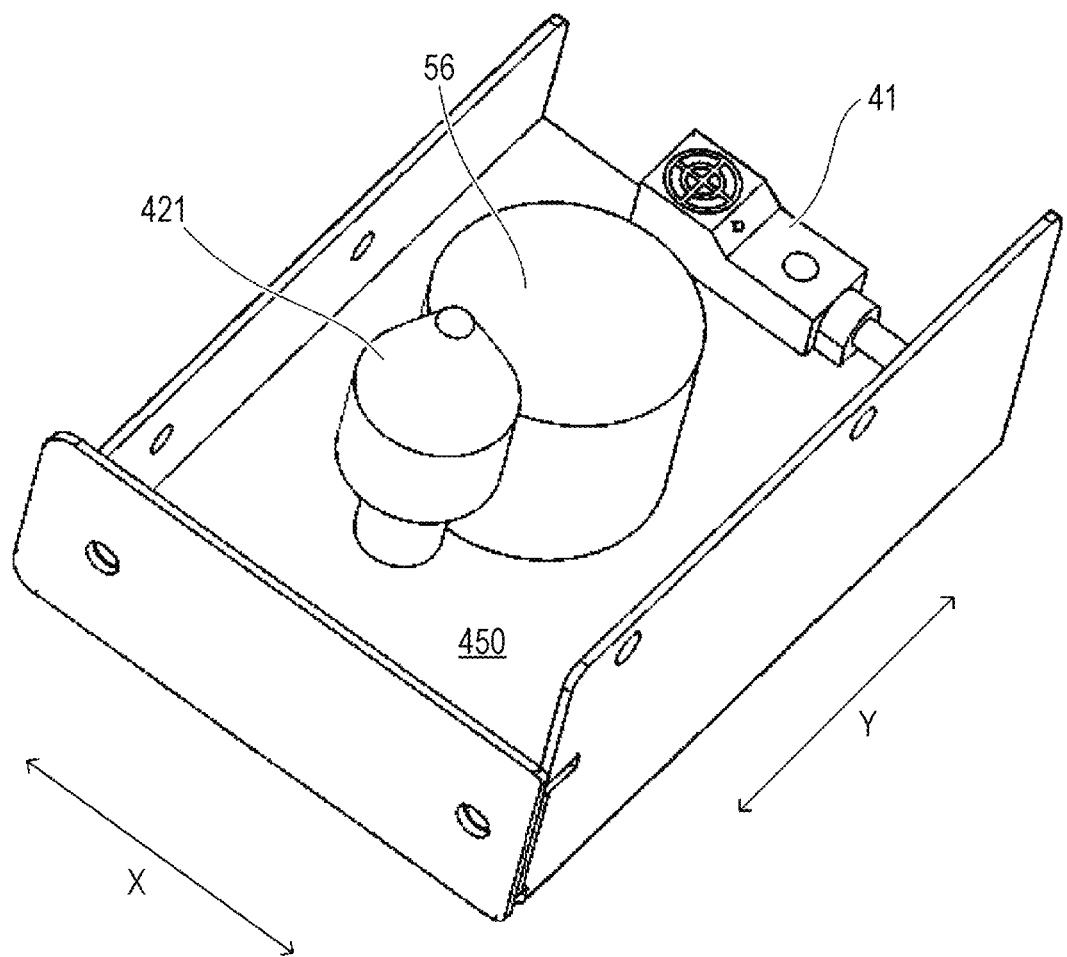
FIG. 17 is a perspective view illustrating a hand main body portion in a state in which members constituting a top surface are removed.
Figure 18:
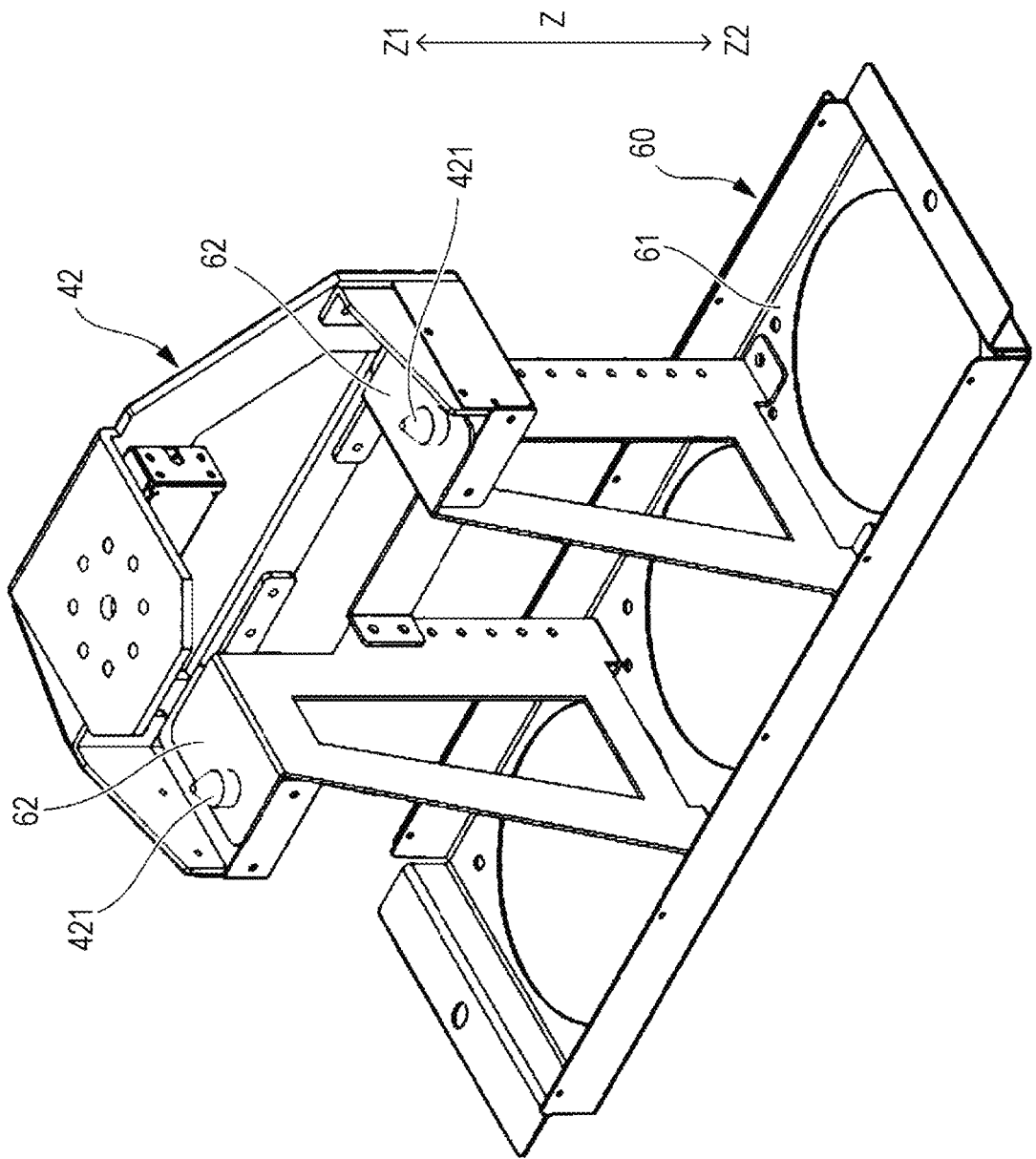
FIG. 18 is a perspective view illustrating an engaged state of the hand main body portion and a tray.
Figure 19:
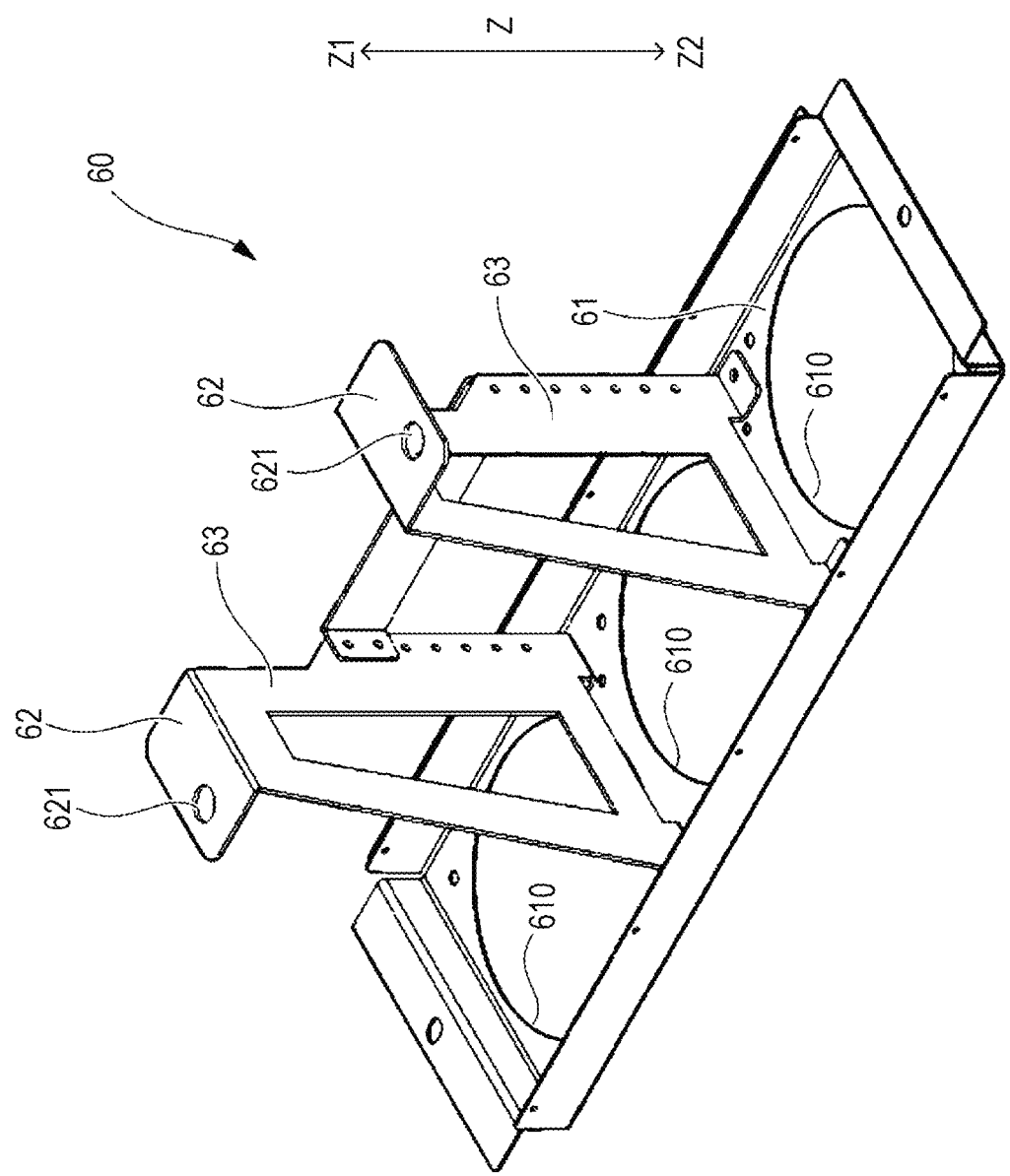
FIG. 19 is a perspective view illustrating a single state of the tray.
Figure 19A:
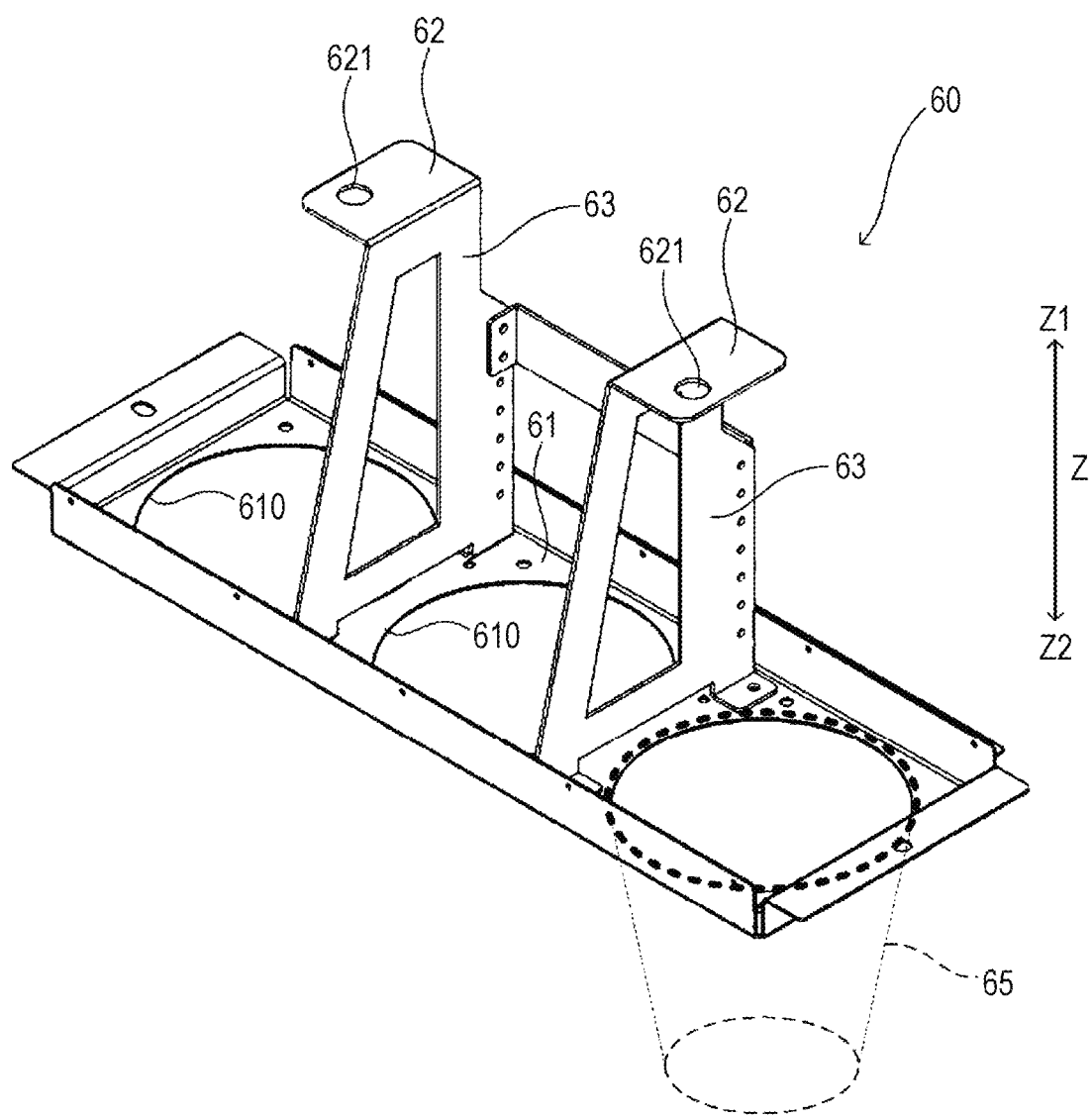
FIG. 19A is a perspective view illustrating a state in which a hand strainer is inserted into the tray.

FIG. 16 is a perspective view illustrating a hand main body portion 42 of the robot hand 40. FIG. 17 is a perspective view illustrating the hand main body portion 42 in a state in which members constituting a top surface 420 are removed. FIG. 18 is a perspective view illustrating an engaged state of the hand main body portion 42 and the tray 60. FIG. 19 is a perspective view illustrating a single state of the tray 60, and FIG. 19A is a perspective view illustrating a state in which a hand strainer (sieve basket) is inserted into the tray 60. In FIG. 16, an X direction and a Y direction are defined as mutually-perpendicular two directions with reference to the top surface 420 of the hand main body portion 42. Furthermore, in FIGS. 18, 19, and 19A, a Z direction is defined. The Z direction is a direction vertical to a support surface in a tray portion 61 of the tray 60. Hereinafter, a term related to an up-down direction (for example, top surface, bottom surface, etc.) is sometimes used assuming that a Z direction Z1 side is an "upper side" and a Z direction Z2 side is a "lower side".

The robot hand 40 is formed into a shape preferable for picking up the tray 60 and placing the tray 60 at a predetermined position (the first section 51, the sub-section 522, etc.). The robot hand 40 includes the hand main body portion 42 to be engaged with the tray 60.

The hand main body portion 42 has the top surface 420 that gets surface contact with bottom surfaces of a pair of supported portions 62 of the tray 60 when the hand main body portion 42 engages with the tray 60. In FIG. 16, the top surface 420 is supported by a plate member 400 having an attachment surface 400A to be attached to the distal end 21b of the robot 21A. The top surface 420 receives gravitational force of the tray 60. More specifically, the hand main body portion 42 picks up the tray 60 in such a manner as to scoop up the supported portions 62 of the tray 60. With this configuration, even in a case where the engagement reinforcement means 56 becomes nonfunctional due to an abnormality of power or the like while the tray 60 being lifted up via the hand main body portion 42, engagement between the hand main body portion 42 and the tray 60 can be maintained (i.e., dropping of the tray 60 can be prevented).

The hand main body portion 42 is provided with pins 421. The pins 421 are provided in such a manner as to protrude upward from the top surface 420, for example. The number of pins 421 may be an arbitrary number. In FIG. 16, two pins 421 are provided in such a manner as to correspond to the pair of respective supported portions 62. By being inserted into corresponding holes 621 in the tray 60, the pins 421 fulfill a positioning function when the hand main body portion 42 engages with the tray 60. In addition, in a modified example, pins (for example, downward pins) may be formed on the tray 60 side, and corresponding holes may be formed on the hand main body portion 42 side.

The pins 421 may have an arbitrary cross-sectional shape, but preferably have a shape tapering toward the tip with a circular cross section. With this configuration, even in a case where a slight deviation exists between the tray 60 and the hand main body portion 42 immediately before engagement, an engaged state of them can be realized while correcting the deviation.

In the hand main body portion 42, the engagement reinforcement means 56 (schematically illustrated in FIG. 16) is provided. In addition, on the top surface 420, a hole 561 for the engagement reinforcement means 56 may be formed. With this configuration, a degree of engagement between the hand main body portion 42 and the tray 60 can be effectively increased. The number of engagement reinforcement means 56 may be an arbitrary number. In FIG. 16, two engagement reinforcement means 56 are provided in such a manner as to correspond to the pair of respective supported portions 62. In the present embodiment, the engagement reinforcement means 56 is an electromagnet, and the supported portion 62 is formed by a magnetic body. With this configuration, if an electromagnet enters an on state, a degree of engagement between the hand main body portion 42 and the tray 60 increases. With this configuration, even in a case where large vibration or the like occurs due to disturbance or the like, a possibility that engagement between the hand main body portion 42 and the tray 60 can be maintained can be increased.

In the hand main body portion 42, the signal generation unit 41 (schematically illustrated in FIG. 17) is provided. The signal generation unit 41 is provided within a region on the top surface 420 that gets surface contact with the bottom surface of the supported portion 62 of the tray 60. In addition, on the top surface 420, a hole for the signal generation unit 41 may be formed. The signal generation unit 41 detects a proximity state of the supported portion 62 with respect to the hand main body portion 42. In the present embodiment, the signal generation unit 41 generates a predetermined signal indicating a proximity state, in a case where a distance in the Z direction between the top surface 420 of the hand main body portion 42 and the bottom surface of the supported portion 62 of the tray 60 becomes equal to or smaller than a threshold value. The signal generation unit 41 may be a proximity sensor, for example. In addition, a pair of signal generation units 41 may be provided in such a manner as to correspond to the respective supported portions 62, or the signal generation unit 41 may be provided in such a manner as to correspond to one of the supported portions 62.

In addition, the hand main body portion 42 preferably includes a mounting space 450 below the top surface 420 as illustrated in FIG. 17. Note that FIG. 17 illustrates the robot hand 40 in a state in which a member forming the top surface 420 is removed. Lower portions of the pins 421, the engagement reinforcement means 56, the signal generation unit 41, cables, and the like may be arranged within the mounting space 450.

In the present embodiment, a state in which the tray 60 is engaged with the hand main body portion 42 is a first engaged state (refer to FIG. 18). At this time, the engagement reinforcement means 56 does not function or is faint. In addition, in a case where the engagement reinforcement means 56 is an electromagnet, in a case where current (or magnetic force) supplied for causing a second engaged state is 100, "faint" means that current is significantly smaller than 100. For example, the current is equal to or smaller than 50 and preferably equal to or smaller than 10. Then, if the engagement reinforcement means 56 functions, the second engaged state in which a degree of engagement between the hand main body portion 42 and the tray 60 increases may be caused. Transition (switch) from the first engaged state to the second engaged state is implemented by the processing apparatus 11. Specifically, as described above, in a case where the signal generation unit 41 is a proximity sensor, for example, the proximity sensor generates a predetermined signal in a case where the first engaged state of the tray 60 with respect to the hand main body portion 42 is detected. The processing apparatus 11 implements transition (switch) from the first engaged state to the second engaged state being triggered by the generation of the predetermined signal. Note that the signal generation unit 41 is preferably configured not to generate the predetermined signal in an engaged state in which positioning is not performed via the pins 421. More specifically, the signal generation unit 41 preferably generates the predetermined signal only in a case where an engaged state in which positioning is performed via the pins 421 is detected.

In addition, in the first engaged state and the second engaged state, a positional relationship between the robot hand 40 and the tray 60 is the same, and is in the state illustrated in FIG. 18.

In addition, transition (switch) from the first engaged state to the second engaged state may be implemented in a state in which gravitational force of the tray 60 acts on the top surface 420 of the hand main body portion 42. Note that, in this case, the signal generation unit 41 may be a sensor or the like that detects the acting state of the gravitational force.

As illustrated in FIG. 19, the tray 60 includes the tray portion 61, the pair of supported portions 62, and leg portions 63 connecting the tray portion 61 and the supported portions 62.

The tray portion 61 includes a plurality of through-holes 610 serving as supporting portions, into which "hand strainers (sieve baskets)" serving as cooking tools are to be inserted. The number of through-holes 610 may be an arbitrary number. In FIG. 19, three through-holes 610 are provided. "Hand strainers (sieve baskets)" to be inserted into the through-holes 610 are supported by rim portions around the through-holes 610. FIG. 19A illustrates a portion of a sieve 65 of a "hand strainer (sieve basket)" inserted into the through-hole 610. Actually, "hand strainers (sieve baskets)" can be respectively inserted into the three through-holes 610.

As described above, the supported portions 62 are portions to be engaged with the hand main body portion 42, and form a first engaged portion and a second engaged portion. The supported portions 62 form bottom surfaces that get surface contact with the top surfaces 420 of the hand main body portion 42. The supported portions 62 include the holes 621 into which the pins 421 of the hand main body portion 42 are to be inserted (fitted).

The leg portions 63 support the supported portions 62 in such a manner as to be positioned above the tray portion 61. A pair of leg portions 63 are provided in such a manner as to correspond to the respective supported portions 62, and their respective upper end portions are connected to the rim portions of the corresponding supported portions 62. Furthermore, lower end portions of the leg portions 63 are fixed to the top surface of the tray portion 61. By providing such leg portions 63, the supported portions 62 can be supported above the tray portion 61 in such a manner that portions forming the top surfaces 420 of the hand main body portion 42 can be positioned below the supported portions 62.

Furthermore, in the present embodiment, when viewed from above, the leg portion 63 is provided at an intermediate position of adjacent through-holes 610. Moreover, the pair of supported portions 62 are provided in such a manner as to respectively correspond to the pair of leg portions 63, and an area of the supported portions 62 that is obtained when viewed from above is suppressed. Thus, an upper space of a "hand strainer (sieve basket)" inserted into the through-hole 610 can be widely opened, and buckwheat noodles can be easily input into the "hand strainer (sieve basket)". More specifically, because the leg portions 63 and the supported portions 62 exist at positions deviating from spaces above "hand strainers (sieve baskets)" inserted in the through-holes 610, and buckwheat noodles can be input into the "hand strainers (sieve baskets)" inserted in the through-holes 610, without the leg portions 63 and the supported portions 62 becoming obstacles when buckwheat noodles are input. For example, among the three arranged through-holes 610, the through-hole 610 positioned at the center is provided at a position not overlapping the supported portions 62 and the leg portions 63, when viewed from above. Thus, buckwheat noodles can also be easily input into the "hand strainer (sieve basket)" inserted in the through-hole 610, from a space between the pair of supported portions 62 and the pair of the leg portions 63.

Figure 20:
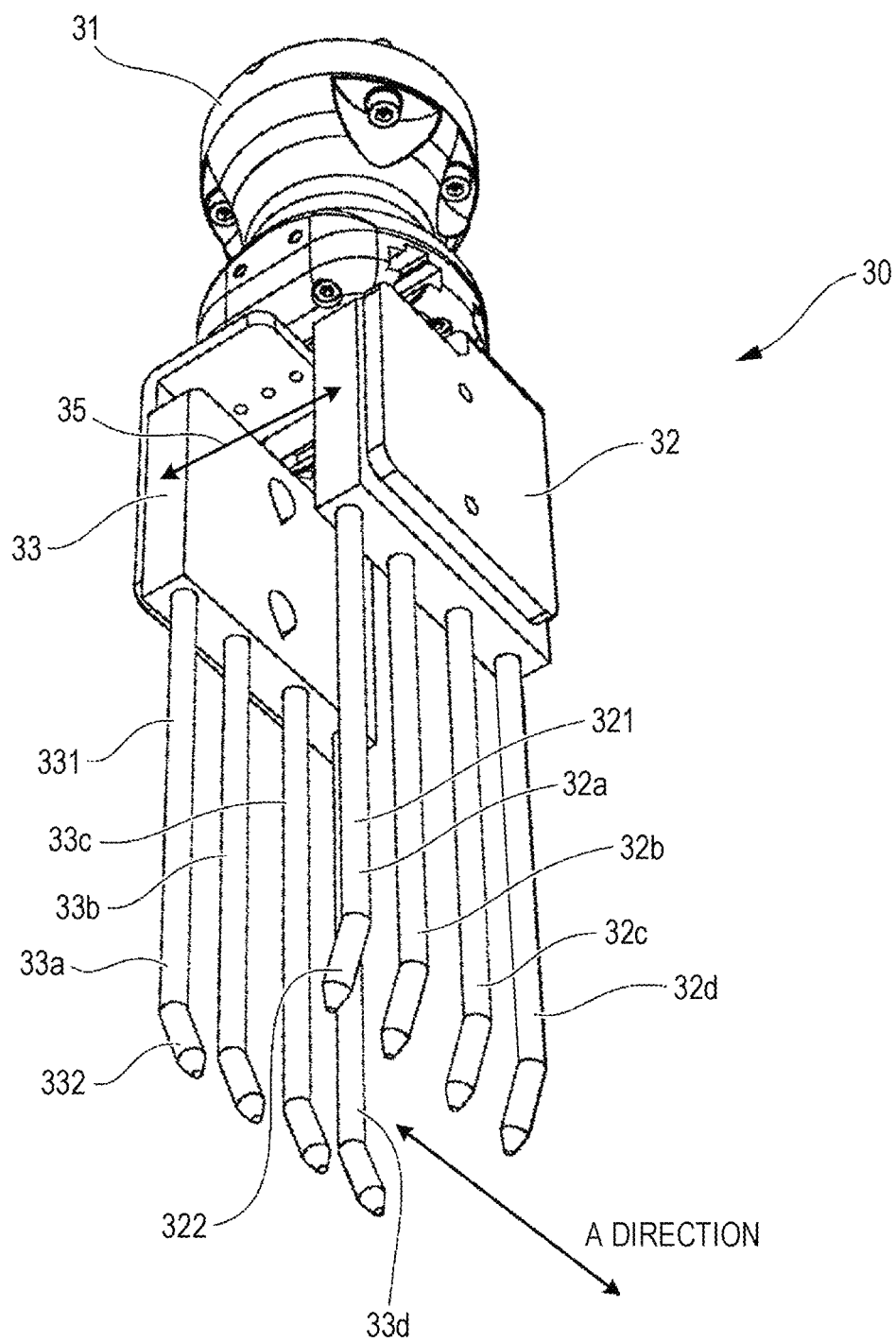
FIG. 20 is a perspective view illustrating a robot hand.

FIG. 20 is a perspective view illustrating the robot hand 30.

The robot hand 30 is formed into a configuration suitable for holding unboiled buckwheat noodles and releasing held buckwheat noodles at a predetermined position.

As illustrated in FIG. 20, the robot hand 30 includes a base portion 31 to be fixed to the distal end 21b of the robot 21B, and a movable portion 32 and a movable portion 33 that slidably move in directions indicated by an arrow 35, with respect to the base portion 31. The movable portion 32 is provided with four nails 32a to 32d, and the movable portion 33 is provided with four nails 33a to 33d. The movable portion 32 and the movable portion 33 simultaneously move in directions that extend along the arrow 35 and are opposite to each other. The robot hand 30 is enabled to repeatedly switch a state between a closed state in which a distance between the movable portion 32 and the movable portion 33 becomes the shortest, and an opened state in which the distance becomes the longest. The nails 32a to 32d and the nails 33a to 33d are arrayed in an A direction illustrated in FIG. 20 (direction orthogonal to the arrow 35).

The nails 32a to 32d each include a proximal end portion 321 (displayed only for the nail 32a in FIG. 20) linearly extending from the movable portion 32, and a distal end portion 332 (displayed only for the nail 32a in FIG. 20) formed with being folded from the proximal end portion 321. Similarly, the nails 33a to 33d each include a proximal end portion 331 (displayed only for the nail 33a in FIG. 20) linearly extending from the movable portion 33, and a distal end portion 332 (displayed only for the nail 33a in FIG. 20) formed with being folded from the proximal end portion 331. In the example illustrated in FIG. 20, the proximal end portion 321 and proximal end portion 331 extend parallel to each other.

The nails 32a and 33a, the nails 32b and 33b, the nails 32c and 33c, and the nails 32d and 33d each form a pair, and the distal end portions 322 and the distal end portions 332 of the paired nails extend in a direction of getting close to each other toward the tips of the nails.

When the robot hand 30 is in the closed state, the robot hand 30 is enabled to hold unboiled buckwheat noodles by nipping the buckwheat noodles between the nails 32a to 32d and the nails 33a to 33d by bringing the distal ends of the nails 32a to 32d closer to the respective distal ends of the nails 33a to 33d. At this time, because the distal end portions 322 and the distal end portions 332 of the paired nails extend in the direction of getting closer to each other, the proximal end portions 321 and proximal end portions 331 cover side portions on both sides of buckwheat noodles in such a manner as to nip the buckwheat noodles, and at the same time, the distal end portions 322 and the distal end portions 332 support the buckwheat noodles from below. It is therefore possible to effectively prevent buckwheat noodles from dropping. In addition, when the robot hand 30 is in the closed state, the distal end portions 322 and the distal end portions 332 of the paired nails may get contact with each other, or may be separated from each other with a slight interval. A positional relationship between the distal end portions 322 and the distal end portions 332 can be appropriately set in accordance with the characteristics of a target object to be held.

If the robot hand 30 transitions from the closed state to the opened state, buckwheat noodles held with being nipped between the nails 32a to 32d and the nails 33a to 33d are released from the robot hand 30 by dropping due to their own weights in such a manner as to slip from the space between the distal end portions 322 and the distal end portions 332.

As illustrated in FIG. 20, in a case where paired nails are provided, the total number of nails becomes an even number (eight in FIG. 20). Furthermore, at this time, from the perspective of prevention of dropping of buckwheat noodles caught by nails, the number of pairs of nails is desirably set to two or more. In other words, it is desirable to set the number of nails to four or more.

Figure 21:
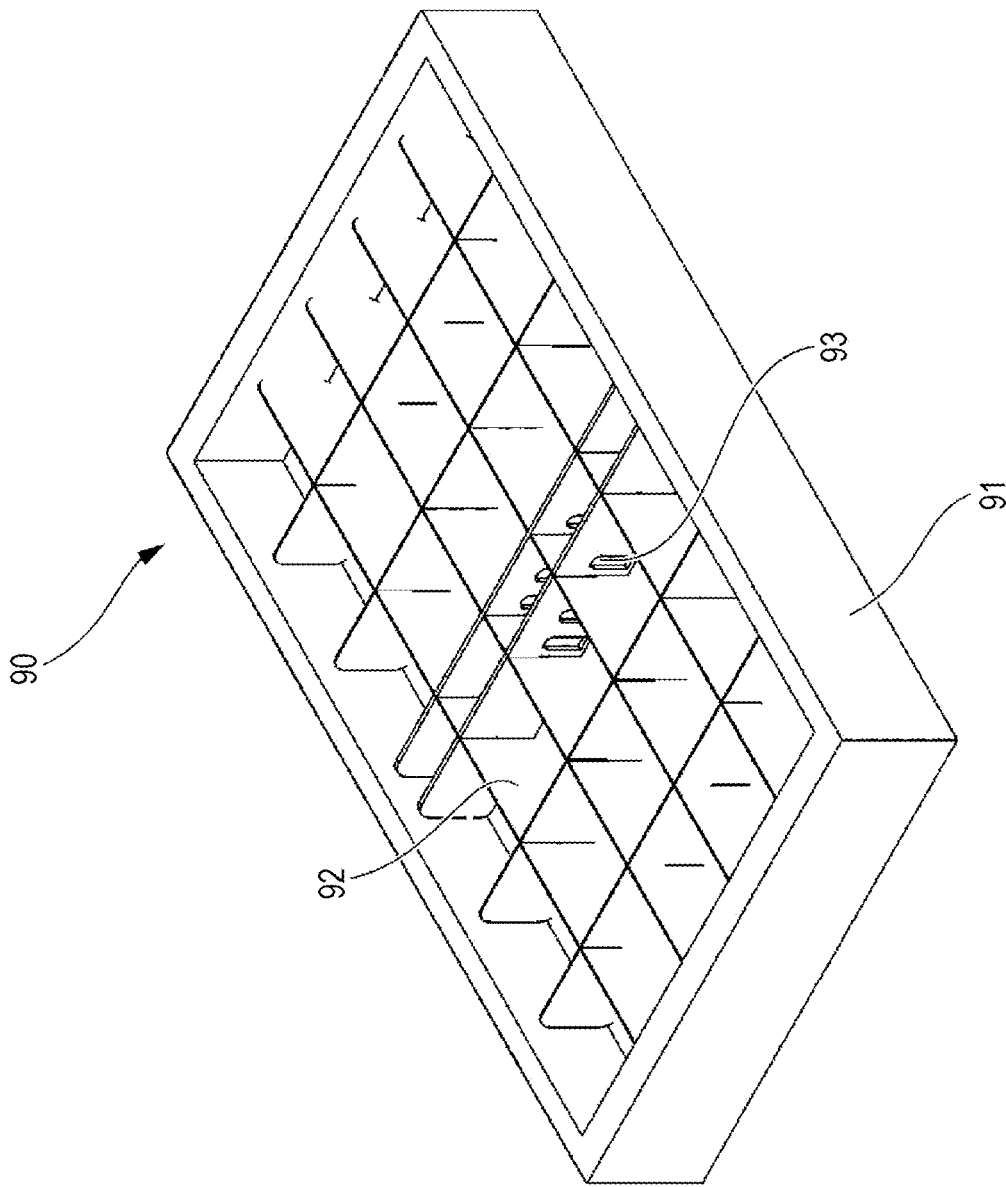
FIG. 21 is a perspective view illustrating a container storing buckwheat noodles.
Figure 22:
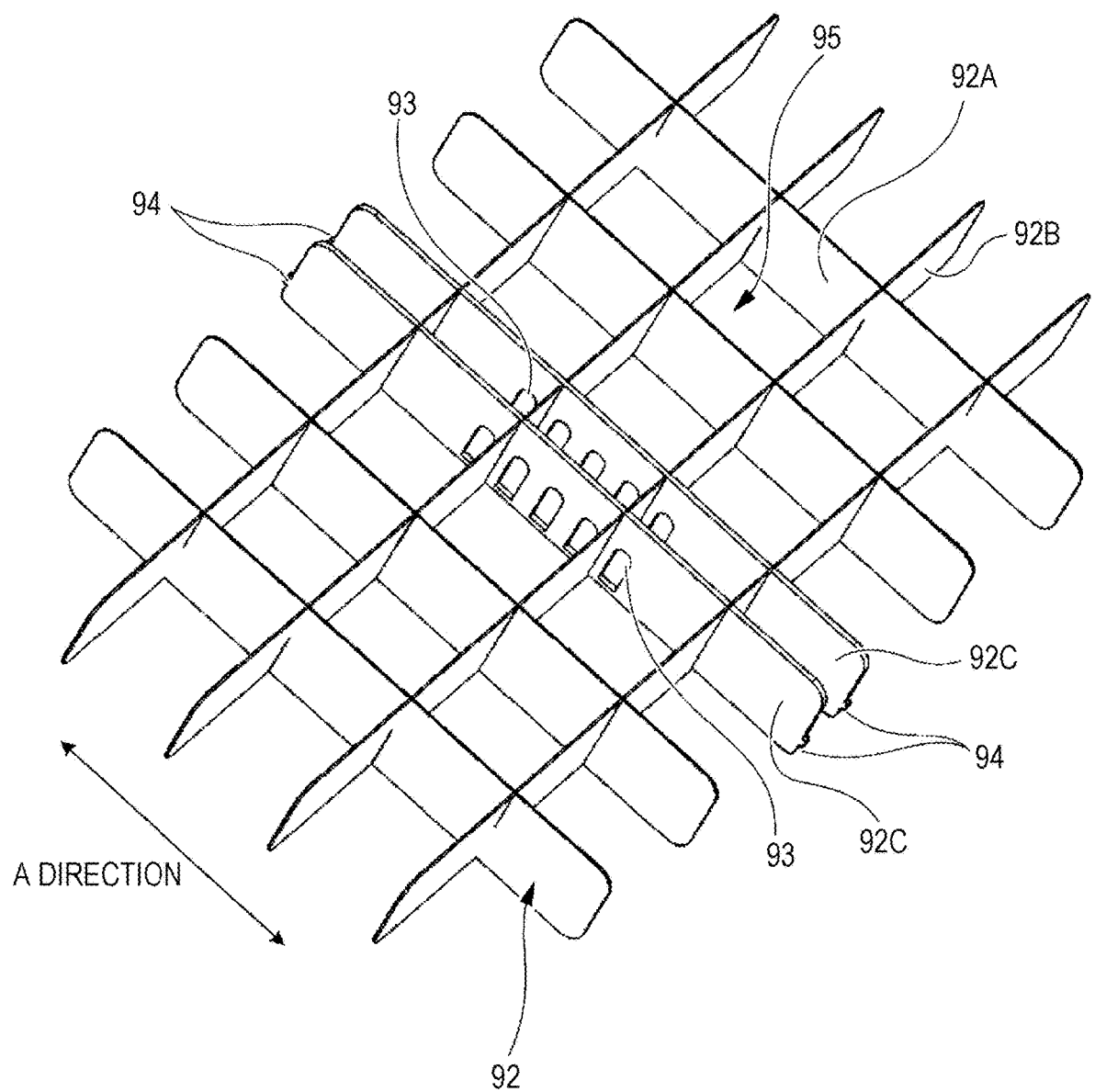
FIG. 22 is a perspective view illustrating a divider.

FIG. 21 is a perspective view illustrating a container 90 storing buckwheat noodles, and FIG. 22 is a perspective view illustrating a divider 92.

The container 90 includes a container main body 91 having a bottomed shape, and the divider 92 partitioning the inside of the container main body 91. A rectangular internal space of the container main body 91 is partitioned into a matrix by standing walls 92A, 92B, and 92C of the divider 92. For example, a region 95 in FIG. 22 indicates one of regions partitioned by the divider 92. One lump of buckwheat noodles is stored into each region partitioned by the divider 92.

In addition, the shape of the divider 92 may be an arbitrary shape. For example, intervals of the divider 92 may be varied in such a manner that regions with a plurality of sizes are formed. With this configuration, different amounts of buckwheat noodles such as big serving and small serving, for example, become manageable.

A predetermined amount (e.g., one portion) of buckwheat noodles is stored into each of the regions partitioned by the divider 92. By presetting unboiled buckwheat noodles into regions partitioned by the divider 92, it becomes possible for the robot hand 30 to surely catch the total amount of buckwheat noodles stored in the regions. More specifically, if the nails 32a to 32d and the nails 33a to 33d of the robot hand 30 in the opened state are inserted into the regions, and the robot hand 30 is shifted to the closed state, buckwheat noodles stored in the regions are nipped between the nails 32a to 32d and the nails 33a to 33d, and the total amount of buckwheat noodles stored in the regions are held. The robot hand 30 can catch a cooking target such as buckwheat noodles that might scatter, for each lump.

If the robot hand 30 is moved to a predetermined position and the robot hand 30 is shifted to the opened state, buckwheat noodles are released at the position.

As illustrated in FIGS. 21 and 22, engagement holes 93 serving as an engagement portion with which the nails 32a to 32d and the nails 33a to 33d of the robot hand 30 can engage are formed in the divider 92. A pitch of the engagement holes 93 in an A direction illustrated in FIG. 22 is identical to a pitch of the nails 32a to 32d and the nails 33a to 33d in the A direction illustrated in FIG. 20. Furthermore, engagement nails 94 for engaging the divider 92 with the container main body 91 are formed in the divider 92.

In a state in which the A direction in FIG. 20 and the A direction in FIG. 22 are matched, if the nails 32a to 32d and the nails 33a to 33d of the robot hand 30 in the opened state are inserted downward into a predetermined position in the container main body 91, and the robot hand 30 is shifted to the closed state, the nails 32a to 32d and the nails 33a to 33d are inserted into the engagement holes 93. If the robot hand 30 is moved upward from the state, in a state in which the nails 32a to 32d and the nails 33a to 33d engage with the engagement holes 93, the container main body 91 engaged with the divider 92 via the engagement nails 94 (i.e., the entire container 90) is lifted together with the divider 92. After that, if the robot hand 30 is moved, the container 90 is placed at a predetermined position, and the robot hand 30 is shifted to the opened state, the nails 32*a* to 32*d* and the nails 33*a* to 33*d* are detached from the engagement holes 93. In this manner, the container 90 can be moved to the predetermined position.

In this manner, because the engagement holes 93 with which the nails 32*a* to 32*d* and the nails 33*a* to 33*d* of the robot hand 30 can engage are formed in the divider 92, the robot 21B exerts a function of not only catching and conveying unboiled buckwheat noodles but also catching and conveying the container 90, via the robot hand 30. Thus, there is no need to increase the number of robots, or preparing a plurality of types of robot hands and replacing a hand for moving the container 90. For example, the robot 21B can move, via the robot hand 30, the container 90 that has got empty, from the fourth section 54 to a fifth section 55 (FIG. 14). If the containers 90 storing buckwheat noodles are preliminarily stacked in the fourth section 54, the containers 90 getting empty can be timely moved by the robot 21B in order from above onto a table or a trolley placed on a floor in the fifth section 55, for example. When the container 90 is to be released to the fifth section 55, the weight of the container 90 to be applied to the robot hand 30 may be measured using a sensor, and the container 90 may be released at a timing at which the weight becomes smaller than a predetermined value. With this configuration, it becomes possible to release the container 90 in a state in which the container 90 is substantially placed in the fifth section 55, and the dropping of the container 90 can be prevented.

Furthermore, the container 90 may be provided with a weight sensor included in the sensors 74*b*, and whether or not the container 90 stores buckwheat noodles may be detected using the weight sensor In a case where all buckwheat noodles in the container 90 are conveyed and the container 90 gets employ, based on detection information from this weight sensor, the processing apparatus 11 can transmit, to the robot 21B, a command to move the container 90 to the fifth section 55. Based on an image captured by the camera 74*a* (image sensor), it may be detected that the container 90 has got empty, by processing in the image processing apparatus 12. Furthermore, this may be detected using another sensor 74*b* such as a weight sensor provided in the fourth section 54, for example. A work of conveying buckwheat noodles is executed while it is detected that buckwheat noodles remain in the container 90.

In FIG. 22, ten engagement holes 93 are provided in total, but the number of engagement holes 93 may be an arbitrary number. The number of engagement holes 93 may be set to eight in synchronization with the nails 32*a* to 32*d* and the nails 33*a* to 33*d*. Furthermore, the shape of engagement portions exemplified as the engagement holes 93 is not limited, either. The engagement portions need not be holes, and are included to enable the nails 32*a* to 32*d* and the nails 33*a* to 33*d* to engage with the engagement portions.

In addition, a distance between the distal end portion 322 and the distal end portion 332 in the opened state or the closed state of the robot hand 30 may be varied between the case of catching buckwheat noodles and the case of lifting the container 90, and the distance may be optimized for each case.

Furthermore, in the closed state of the robot hand 30, a torque of a motor for driving the nails 32*a* to 32*d* and the nails 33*a* to 33*d* may be varied between the cases in such a manner as to be adapted to each case. With this configuration, force to be applied in the case of catching buckwheat noodles and force to be applied in the case of catching the container 90 can be optimized.

Next, an operation in the present embodiment will be described.

In the present embodiment, the tray 60 prepared in the first section 51 holds an empty "hand strainer (sieve basket)" (FIG. 19A). Via the robot hand 40, the robot 21A picks up the tray 60 on the first section 51, conveys the tray 60 up to the second section 52 (moves the tray 60 in the air), and places the tray 60 in the sub-section 522 in the second section 52. In addition, in the present embodiment, the sub-section 522 is exemplified as a predetermined position at which the tray 60 is to be placed, but a position at which the tray 60 is to be placed may be an arbitrary position. The case where the tray 60 is placed in the sub-section 522 is advantageous in that a conveyance time can be shortened because the sub-section 521 to which the tray 60 is to be conveyed next is adjacent to the sub-section 522.

On the other hand, the robot 21B catches, via the robot hand 30, unboiled buckwheat noodles stored in the container 90 placed on the fourth section 54. As described above, here, by shifting the robot hand 30 from the opened state to the closed state, unboiled buckwheat noodles can be caught by the nails 32*a* to 32*d* and the nails 33*a* to 33*d* from one of the regions partitioned by the divider 92.

Next, via the robot hand 30, the robot 21B conveys unboiled buckwheat noodles up to the second section 52 (moves buckwheat noodles in the air), moves the buckwheat noodles up to the sub-section 521 in the second section 52, and inputs the unboiled buckwheat noodles into a corresponding "hand strainer (sieve basket)" inserted in the tray 60. As described above, when buckwheat noodles are to be input, the buckwheat noodles are moved to the inside of or a space above the corresponding "hand strainer (sieve basket)". Next, by shifting the robot hand 30 from the closed state to the opened state and dropping caught buckwheat noodles, the buckwheat noodles can be input into the corresponding "hand strainer (sieve basket)".

At this time, as described above, the leg portion 63 of the tray 60 is provided at an intermediate position of adjacent through-holes 610 when viewed from above. Moreover, the pair of supported portions 62 are provided in such a manner as to respectively correspond to the pair of leg portions 63 (FIG. 18). Thus, upper spaces of "hand strainers (sieve baskets)" inserted in the through-holes 610 are opened, and the leg portions 63 and the supported portions 62 do not interfere with the robot hand 30 and buckwheat noodles to be conveyed. It is therefore possible to easily input buckwheat noodles into the "hand strainers (sieve baskets)" inserted in the through-holes 610. Buckwheat noodles can be input from a space between the pair of leg portions 63 into the "hand strainer (sieve basket)" inserted in the through-hole 610 positioned at the center among the three arranged through-holes 610.

By repeating such a series of operations of conveying buckwheat noodles stored in the container 90 on the fourth section 54 and inputting the buckwheat noodles into a corresponding "hand strainer (sieve basket)" three times by the robot hand 30, buckwheat noodles can be input into all of the three "hand strainers (sieve baskets)" inserted in the tray 60. In addition, a series of operations to be performed until buckwheat noodles are input can be appropriately changed based on a captured image obtained by the camera 74*a* or the like. For example, in a case where one or two "hand strainers (sieve baskets)" are inserted in the tray 60, a series of operations can be repeated the number of times corresponding to the number of the "hand strainers (sieve baskets)". Furthermore, an operation can be changed in accordance with a status of buckwheat noodles stored in the container 90, such as the number of regions storing buckwheat noodles, for example.

After the robot 21B retracts the robot hand 30 from the second section 52, the robot 21A picks up the tray 60 on the sub-section 522 via the robot hand 40, and immerses buckwheat noodles together with the tray 60 into hot water prepared in the sub-section 521 of the second section 52. A boiling work can be thereby executed. If the boiling work is started, the robot 21A may once dissolve the engagement with the tray 60. In this case, another work can also be executed until the boiling work ends.

Subsequently, if a predetermined time elapses from when the boiling work is started, the robot 21A picks up the tray 60 in the second section 52, and performs postprocessing in the third section 53. More specifically, the robot 21A first removes sliminess of buckwheat noodles by immersing the tray 60 into cold water stored in the sub-section 531. In addition, at this time, the robot 21A may enhance work efficiency by moving the tray 60 or the like. Furthermore, the cooking area 150 may have a configuration in which cold water is poured upon detection of the tray 60 in the sub-section 531.

Subsequently, the robot 21A carries the tray 60 onto the sub-section 532 and performs a draining work. At this time, draining may be effectively implemented by vertically vibrating the tray 60 with an inclination. If the robot 21A ends the draining work, the robot 21A conveys the tray 60 to the first section 51, and places the tray 60 onto the rail 511 on the first section 51. In addition, at this time, a lane onto which the tray 80 is to be placed may be defined. In this manner, a series of cooking works is implemented.

Next, processing to be performed when buckwheat noodles in the container 90 run out during a process of repeating an operation of inputting buckwheat noodles into hand strainers from the container 90 will be described. The robot 21A detects that buckwheat noodles in the container 90 run out, using the various sensors 74b such as the weight sensor that are preliminary provided in the container 90, or based on images captured by the camera 74a. In a case where the weight sensor is used, a weight equal to or larger than a weight obtained by combining the weights of the container 90 and the divider 92 is no longer detected, it can be detected that buckwheat noodles run out. In a case where the camera 74a is used, it can be detected that buckwheat noodles run out, by determining whether or not buckwheat noodles exist, for all regions partitioned by the divider. Then, in a case where it is detected that buckwheat noodles run out, the container 90 is held and conveyed by the robot hand 30. As for the container 90 storing new buckwheat noodles, a plurality of containers 90 may be preliminary stacked, and a state of being able to hold new buckwheat noodles may be automatically caused upon detecting a conveyed empty container 90, or the container 90 storing new buckwheat noodles may be conveyed from another section.

In the conveyance of the container 90 that is performed using the robot hand 30, the robot 21A moves the robot hand 30 up to an upper space of the container 90, and causes the robot hand 30 to hold and convey the divider 92 of the container 90. Furthermore, more specifically, when the divider 92 is held, the distal end portions 332 of the robot hand 30 are inserted into the engagement holes 93 provided in the divider 92, the nails 32a to 32d and the nails 33a to 33d, and the divider 92 are engaged via the engagement holes 93, and the container 90 is caught. As described above, by conveying not only buckwheat noodles but also the container 90 using the robot hand 30, automatization of a replacement work of the container 90 can also be implemented using a robot without introducing an additional system.

Meanwhile, for working out a series of processes necessary for boiling buckwheat noodles, as a matter of course, the processing apparatus 11 (FIG. 13) executes control for shifting to the next operation, after each operation ends. For example, after the robot 21A places the tray 60 into the sub-section 522 in the second section 52, the robot 21B inputs unboiled buckwheat noodles into a "hand strainer (sieve basket)" inserted in the tray 60 placed in the sub-section 522. After buckwheat noodles are input into all "hand strainers (sieve baskets)", by the robot 21A picking up the tray 60 and immersing the tray 60 into the sub-section 521 of the second section 52, a boiling work of buckwheat noodles is started. Subsequently, a plurality of works is sequentially executed, and by buckwheat noodles in a tightened (cooled) state being lastly placed onto the first section 51, all processes end.

For executing such processes only once in the shortest time, it is sufficient that a time from when a specific work ends to when the specific work shifts to the next work is made as short as possible without the movements of the robot 21A and the robot 21B interfering with each other. In this case, for example, it is sufficient that, at the time point at which the specific work ends, the robot 21A or the robot 21B receives a command indicating that the next work is to be started, and the next work is started by the robot 21A or the robot 21B in accordance with this command.

Nevertheless, in a case where the above-described series of processes are successively performed at the same time in an overlapping manner, it is necessary to consider a work time required for each process. For example, a time required for a boiling work of buckwheat noodles that is to be executed in the sub-section 521 of the second section 52 is determined, and boiling is not permitted to be performed for a time exceeding a predetermined time, but if the robot 21A is performing another work at a timing at which a predetermined boiling time elapses, there has been concern that buckwheat noodles undergoing the boiling work is boiled for a time equal to or larger than the predetermined time.

Thus, in the present embodiment, the processing apparatus 11 manages a start timing of a work in a case where a series of processes are repeated.

FIG. 23 is a time-line chart illustrating timings of works in a series of processes. Furthermore, FIG. 24 is a diagram exemplifying how to use a cooking area.

In FIG. 23, a direction of time lapse corresponds to a right direction, and lanes LN1 to LN3 in FIG. 23 respectively correspond to the trays 60 placed on lanes LN1 to LN3 set in the first section 51 illustrated in FIG. 24. FIG. 23 illustrates works to be performed on the trays 60 placed on the lanes LN1 to LN3. For example, a time-line chart illustrated on the top row indicates a work to be performed on the tray 60 placed on the lane LN1, and a time-line chart illustrated on the second row indicates a work to be performed on the tray 60 placed on the lane LN2.

FIG. 24 illustrates a part of the cooking area 150 viewed from above. FIG. 24 illustrates that, in the sub-section 521, cooking (cooking of boiling buckwheat noodles) can be simultaneously performed on two trays 60. Nevertheless, depending on the space of a cooking area, a required cooking speed, or the like, three or more trays 60 may be made simultaneously cookable.

A process ST1 in FIG. 23 corresponds to a work in which the robot 21A that has received a cooking command conveys the tray 60 in the first section 51 and places the tray 60 into the sub-section 522 in the second section 52. The cooking command may be generated by receiving information indicating that a customer has purchased a product on a ticket-vending machine, or may be generated by operating a cooking system after a store staff receives an order from a customer. A process ST11 corresponds to a work of detecting that the tray 60 is placed in the sub-section 522, and setting unboiled buckwheat noodles into a "hand strainer (sieve basket)" of the tray 60 placed in the sub-section 522, using the robot 21B. In accordance with the number of orders received at the time point, the robot 21B sets buckwheat noodles into three hand strainers of the tray 60. More specifically, if the number of orders is equal to or larger than three, buckwheat noodles are set into all hand strainers, and if the number of orders is equal to or smaller than two, buckwheat noodles are set into the same number of hand strainers as the number of orders. A process ST2 corresponds to a work detecting that the work of setting buckwheat noodles into hand strainers has ended, and moving the tray 60 in the sub-section 522 up to the sub-section 521 and inputting the tray 60 into the sub-section 521 using the robot 21A.

A process ST3 corresponds to a work of boiling buckwheat noodles in the sub-section 521 using the robot 21A. A process ST31 included in the process ST3 corresponds to a work of shaking the tray 60 and disentangling buckwheat noodles in hot water using the robot 21A. In the process ST31, a work of shaking the tray 60 is performed in a region closer to the center of a sink in the sub-section 522 that stores hot water. Because a boiling time of buckwheat noodles corresponds to the time of the process ST3, the time of the process ST3 is strictly managed. In addition, on the assumption that the time of the process ST3 is punctual, at the time point at which the process ST31 ends, the tray 60 can be set in the sub-section 521, and the robot 21A can once release the tray 60 and exit from the sub-section 521.

A process ST4 corresponds to a work of the robot 21A conveying the tray 60 from the second section 52 to the third section 53 at a timing at which a predetermined boiling time elapses, and sequentially removing sliminess of buckwheat noodles and further tightening buckwheat noodles in the sub-section 531 and the sub-section 532. For managing the boiling time in the process ST3, a start timing of the work in the process ST4 is strictly managed. A process ST5 corresponds to a work of returning the tray 60 having undergone the process ST4, to corresponding lanes LN1 to LN3 in the first section 51.

In addition, after the work in the process ST5 ends, before the work in the process ST1 on the same lane is started, a worker performs a work of receiving the tray 60 storing boiled buckwheat noodles, from the first section 51, and setting the new tray 60 onto a corresponding lane in the first section 51.

Meanwhile, as described above, the sub-section 521 can simultaneously receive two or more trays 60 and simultaneously boil buckwheat noodles stored in the trays 60. Accordingly, in a case where the processes exemplified in FIG. 23 are planned, at the time point at which the process ST31 on the lane LN1 (top row in FIG. 23) ends, the robot 21A can shift to the process ST2 on the lane LN2 (second row in FIG. 23). Nevertheless, in the present embodiment, for keeping to a time of boiling buckwheat noodles, after a predetermined time elapses from the end of the work in the process ST31, the processing apparatus 11 starts the work in the process ST2 on the next lane using the robot 21A. This substantially means that a timing of the work in the process ST2 on the tray 60 on the next lane is defined in accordance with the timing of the work in the process ST2. In a case where a work in the process ST2 on the lane LN2 is started by the robot 21A before the above-described predetermined time elapses after the work end in the process ST31 on the lane LN1, a start time of the process ST4 on the lane LN2 comes during the work in the process ST4 or the process ST5 on the lane LN1, and a boiling time on the lane LN2 is extended. Here, for adjusting the above-described predetermined period, by setting a time AT1 from the start of the process ST2 on the lane LN1 to the start of the process ST2 on the lane LN2 to become equal to or larger than a total time of the processing times of the process ST4 and the process ST5 (the time of the processes executed in a second operation), it is possible to surely prevent a start time of the process ST4 on the lane LN2 from coming during the work in the process ST4 or the process ST5 on the lane LN1.

Furthermore, in a case where the processes exemplified in FIG. 23 are planned, at the time point at which the process ST1 on the lane LN1 (top row in FIG. 23) ends, the robot 21A can shift to the work process ST2 on the next tray 60 placed on the lane LN1. Nevertheless, in the present embodiment, for keeping to a time of boiling buckwheat noodles, after a predetermined time elapses from the work end in the process ST5, the processing apparatus 11 starts the work in the process ST2 using the robot 21A. More specifically, under the condition that a predetermined time elapses after the work end in the process ST5, the processing apparatus 11 causes the robot 21A to start the work in the process ST2 on the tray 60 on the same lane such as the lane LN1, for example. This substantially means that a timing of the work in the process ST2 on the next tray 60 on the same lane is defined in accordance with the timing of the work in the process ST2. In a case where the work in the process ST2 on the same lane (for example, lane LN1) is started by the robot 21A before the above-described predetermined time AT2 elapses after the work end in the process ST5 on a specific lane (for example, lane LN1), the work in the process ST2 conflicts with a work (for example, the work in the process ST4 or the process ST5) required on another (for example, lane LN3), and a boiling time needs to be extended.

In the example in FIG. 23, in accordance with the control of the processing apparatus 11, the robot 21A executes works in the process ST1, the process ST2, and the process ST31 on the next lane (for example, lane LN2) after the work end in the process ST31 on a predetermined lane (for example, lane LN1). If the work in the process ST31 on the next lane (for example, lane LN2) ends, the robot 21A returns to the work in the process ST4 on the predetermined lane (for example, lane LN1). In this manner, by adjusting a timing at which the work in the process ST2 is started by the robot 21A, the robot 21A can concurrently perform works on another lane utilizing a boiling time. In contrast to this, in a case where the work in the process ST2 on the next lane is started by the robot 21A before the above-described predetermined time elapses after the work end in the process ST5, work times of the robot 21A that are required on a plurality of lanes overlap. Furthermore, in a case where the work in the process ST2 on the next tray 60 on the same lane is started by the robot 21A before the above-described predetermined time elapses after the work end in the process ST5, work times of the robot 21A that are required on a plurality of lanes overlap. In these cases, the start of the process ST4 on any of the lanes gets delayed, and a boiling time of buckwheat noodles becomes longer.

In this manner, in the present embodiment, under the condition that a predetermined time elapses after the work end in the process ST5, the work in the process ST2 on the tray 60 on a corresponding lane is started by the robot 21A.

Also in the first embodiment, similar consideration needs to be made on the work of the robot 21. Also in the first embodiment, by causing the robot 21 to execute a work corresponding to the work in the process ST2, under the condition that a predetermined time elapses after the end of a work corresponding to the work in the process ST5, a fixed boiling time can be ensured.

As described above, the second embodiment discloses a control program for causing a computer to execute robot control processing for causing a first robot (the robot 21A) and a second robot (the robot 21B) to execute a plurality of operations in the cooking area 150 including a plurality of sections, the plurality of operations including a fourth operation of setting a cooking auxiliary tool (the tray 60) at a predetermined position that is to be executed by the first robot, a fifth operation of picking up a cooking target (buckwheat noodles) and setting the cooking target into the cooking auxiliary tool set at the predetermined position by the first robot that is to be executed by the second robot, a first operation of picking up, at the predetermined position, the cooking auxiliary tool in which the cooking target is set by the fifth operation, conveying the cooking auxiliary tool to the second section 52, and causing the cooking target in the cooking auxiliary tool to undergo first cooking processing in the second section 52, and a second operation of picking up the cooking auxiliary tool storing the cooking target having undergone the first cooking processing in the second section 52, and conveying the cooking auxiliary tool to the third section 53. With this configuration, in contrast to the first embodiment, in the second embodiment, the setting of the cooking target can also be automatized.

Furthermore, the second embodiment discloses the control program in which the predetermined position is positioned in the second section 52.

Furthermore, the second embodiment discloses the control program in which the first robot is arranged on one side of the first section 51 in an arrangement direction of the plurality of sections, and the second robot is arranged on another side of the first section 51 in the arrangement direction.

Furthermore, the second embodiment discloses the control program in which the third section 53 includes a plurality of sub-sections allocated to different pieces of cooking processing, and the plurality of sub-sections is arranged in order from the first section 51 toward another side in accordance with an order of cooking processing.

Furthermore, the second embodiment discloses the control program in which the robot control processing causes a robot to repeatedly execute the first operation and the second operation, and an operation timing of the first operation is defined in accordance with an operation timing of the first operation executed previous time.

Furthermore, the second embodiment discloses the robot hand 40 in which the cooking auxiliary tool (the tray 60) includes the tray portion 61 including a first engaged portion and a second engaged portion (the supported portions 62) separated from each other in a direction intersecting with an up-down direction, with which a robot hand can engage, and a plurality of supporting portions (through-holes 610) that are simultaneously supported by the first engaged portion and the second engaged portion (the supported portions 62), and can set the cooking target (buckwheat noodles) into a surface intersecting with the up-down direction, and at least one of the plurality of supporting portions (through-holes 610) is provided at a position not overlapping the first engaged portion and the second engaged portion (the supported portions 62) in a top view.

Furthermore, the second embodiment discloses the cooking auxiliary tool (the tray 60) including the tray portion 61 including a first engaged portion and a second engaged portion (the supported portions 62) separated from each other in a direction intersecting with an up-down direction, with which a robot hand can engage, and a plurality of supporting portions (through-holes 610) that are simultaneously supported by the first engaged portion and the second engaged portion (the supported portions 62), and can set the cooking target (buckwheat noodles) into a surface intersecting with the up-down direction, and at least one of the plurality of supporting portions (through-holes 610) is provided at a position not overlapping the first engaged portion and the second engaged portion (the supported portions 62) in a top view.

With these configurations, because a work space for the robot 21B can be ensured above the supporting portions (through-holes 610), it is possible to easily set the cooking target (buckwheat noodles) into the supporting portions (through-holes 610). With this configuration, in contrast to the first embodiment, in the second embodiment, the setting of the cooking target can also be automatized.

Furthermore, the second embodiment discloses a robot hand (30) that can reciprocate between an opened state and a closed state as an operating state, includes nails (32a to 32d, 33a to 33d) moving in accordance with the operating state, and can selectively execute a first opening/closing operation in which the nails catch a cooking target (buckwheat noodles) that might scatter, for one lump, when the operating state is the closed state, and the nails release the cooking target when the operating state is the opened state, and a second opening/closing operation in which the nails catch a container (90) storing the cooking target while partitioning the cooking target for one lump, when the operating state is the closed state, and the nails release the container when the operating state is the opened state.

Furthermore, the second embodiment discloses the robot hand in which the container includes a container main body and a divider (92) partitioning the inside of the container main body for one lump of the cooking target, and the nails catch the container via an engagement portion (the engagement holes 93) formed on the divider.

Furthermore, the second embodiment discloses the robot hand in which the engagement portion exists at a central part of the container.

Furthermore, the second embodiment discloses the robot hand in which the engagement portion is an engagement hole formed in a standing wall (93C) constituting the divider.

Furthermore, the second embodiment discloses the robot hand in which the standing walls in which the engagement holes are formed are provided as a pair, and an interval between the standing walls provided as the pair is smaller than an interval between standing walls (93A, 93B, etc.) of the divider between which the cooking target is to be stored.

Furthermore, the second embodiment discloses the robot hand in which a pair of a plurality of the nails are included, and the pair of the nails respectively engage with a pair of the engagement holes formed in the pair of standing walls.

Furthermore, the second embodiment discloses the robot hand in which each of the pair of the nails includes a distal end portion (322, 332) arranged in such a manner as to support the cooking target from below when the operating state is the opened state.

Furthermore, the second embodiment discloses the robot hand in which, in the first opening/closing operation, the cooking target is released to a cooking tool (hand strainer) supported by a tray (60) that can be conveyed by a robot (21A), and the tray has a shape in which a work space of the robot hand is ensured above the cooking tool supported by the tray.

Furthermore, the second embodiment discloses the robot hand in which the tray includes supported portions (62) to be supported by the robot, a tray portion (61) being positioned below the supported portions, and supporting the cooking tool, and leg portions (63) connecting the supported portions and the tray portion, and the supported portions and the leg portions are provided at positions deviating from the work space.

Furthermore, the second embodiment discloses a control system of a robot hand including a robot hand (30), a sensor (74a, 74b) that detects presence or absence of the cooking target stored in the container, and a processing apparatus (11) that causes the robot hand to selectively execute the first opening/closing operation or the second opening/closing operation in accordance with a detection result obtained by the sensor.

Heretofore, each embodiment has been described in detail, but the present disclosure is not limited to a specific embodiment, and various modifications and changes can be made without departing from the scope set forth in the appended claims. Furthermore, all or a plurality of components in the above-described embodiments can also be combined.

REFERENCE SIGNS LIST

1 Control device
11 Processing apparatus
12 Image processing apparatus
13 Main control unit
14 Storage unit
15 Storage unit
16 Display unit
17 Operation reception unit
18 Warning output unit
21 Robot
21A Robot
21B Robot
21a Proximal end
21b Distal end
30 Robot hand
32a to 32d Nail
33a to 33d Nail
40 Robot hand
41 Signal generation unit
42 Hand main body portion
50 Cooking area
51 First section
52 Second section
53 Third section
54 Fourth section
56 Engagement reinforcement means
60 Tray
62 Supported portion
70 Robot hand
71 Signal generation unit
72 Hand main body portion
74 Sensor
74a Camera
80 Tray
82 Supported portion
100 Cooking system
150 Cooking area
200 Cooking system
512 Support rack
521 Sub-section
522 Sub-section
531 Sub-section
532 Sub-section
721 Pin
W Wall member
W1 Wall member

The invention claimed is:

1. A cooking system, comprising:
a robot; and
a memory storing computer executable instructions which, when executed, cause the robot to execute a plurality of operations comprising:
a first operation including picking up a cooking auxiliary tool in which a cooking target is set in a first section, conveying the cooking auxiliary tool to a second section, and causing the cooking target in the cooking auxiliary tool to undergo first cooking processing in the second section; and
a second operation including conveying the cooking auxiliary tool storing the cooking target having undergone the first cooking processing in the second section to a third section, wherein
the first cooking processing includes heating the cooking target,
a duct is arranged directly above the second section, and
the robot has a base that is fixed to a vertical wall member at a location away from a vapor path between the duct and the second section.

2. The cooking system according to claim 1, wherein the first section, the second section, and the third section are arranged linearly.

3. The cooking system according to claim 2, wherein the base of the robot is attached to the vertical wall member above the third section.

4. The cooking system according to claim 3, wherein the third section is adjacent to the second section.

5. The cooking system according to claim 4, wherein
the second operation further includes causing the cooking target in the cooking auxiliary tool to undergo second cooking processing in the third section, and
the second cooking processing includes post-processing of the cooking target that has undergone the first cooking processing.

6. The cooking system according to claim 1, wherein the heating of the first cooking processing includes boiling the cooking target.

7. The cooking system according to claim 1, wherein the third section is between the first section and the second section along an axis.

8. The cooking system according to claim 1, wherein
the first operation conveys the cooking auxiliary tool between the first section and second section by moving the cooking auxiliary tool along a first axis, and
the second operation conveys the cooking auxiliary tool between the second section and third section by moving the cooking auxiliary tool along the first axis.

9. The cooking system according to claim 8, wherein the base of the robot is attached to the vertical wall member above the third section along a second axis perpendicular to the first axis.

10. A cooking system, comprising:
   a first robot;
   a second robot; and
   a memory storing computer executable instructions which, when executed, cause the first robot and the second robot to execute a plurality of operations, the plurality of operations comprising:
      a first operation executed by the first robot including setting a cooking auxiliary tool at a predetermined position;
      a second operation executed by the second robot including picking up a cooking target and setting the cooking target into the cooking auxiliary tool set at the predetermined position by the first robot;
      a third operation executed by the first robot including picking up, at the predetermined position, the cooking auxiliary tool in which the cooking target is set by the second operation, and causing the cooking target in the cooking auxiliary tool to undergo first cooking processing in a first section; and
      a fourth operation executed by the first robot including conveying the cooking auxiliary tool storing the cooking target having undergone the first cooking processing in the first section to a second section, wherein
   the first cooking processing includes heating the cooking target,
   a duct is arranged directly above the first section, and
   the first robot has a base that is fixed to a vertical wall member at a location away from a vapor path between the duct and the first section.

11. The cooking system according to claim 10, wherein the base of the first robot is attached to the vertical wall member above the second section.

12. The cooking system according to claim 11, wherein
   a base of the second robot is attached to the vertical wall member in a third section, and
   the second section and the third section are adjacent to the first section so as to sandwich the first section from both sides.

13. The cooking system according to claim 12, wherein the first section, the second section, and the third section are arranged linearly.

14. The cooking system according to claim 13, wherein
   the fourth operation further includes causing the cooking target in the cooking auxiliary tool to undergo second cooking processing in the second section,
   the second cooking processing includes post-processing of the cooking target that has undergone the first cooking processing, and
   the plurality of operations further comprises a fifth operation of conveying a container in which a plurality of uncooked cooking targets is arranged, executed by the second robot in the third section.

15. The cooking system according to claim 14, wherein the first section includes
   a first subsection where the first cooking processing is performed, and
   a second subsection that is adjacent to the first subsection in a direction perpendicular to the wall member so as to be located on a side farther from the wall member than the first subsection, and
   the predetermined position is set in the second subsection.

16. The cooking system according to claim 10, wherein the heating of the first cooking processing includes boiling the cooking target.

17. The cooking system according to claim 12, wherein the second section is between the first section and the third section along an axis.

* * * * *